(12) United States Patent
Kawakami et al.

(10) Patent No.: US 6,329,096 B2
(45) Date of Patent: *Dec. 11, 2001

(54) PROCESS AND APPARATUS FOR RECOVERING COMPONENTS OF SEALED TYPE BATTERY

(75) Inventors: Soichiro Kawakami; Naoya Kobayashi, both of Nara; Masaya Asao, Tsuzuki-gun, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,220

(22) Filed: Mar. 5, 1997

(30) Foreign Application Priority Data

Mar. 5, 1996 (JP) .................................................. 8-073081
Dec. 24, 1996 (JP) .................................................. 8-355438

(51) Int. Cl.[7] .................................................. H01M 10/54
(52) U.S. Cl. .................................................. 429/49; 429/53
(58) Field of Search ................ 429/49, 53; H01M 6/52, H01M 10/54

(56) References Cited

U.S. PATENT DOCUMENTS 4,303,744 * 12/1981 Marincic et al. .................. 429/49 X
5,211,818 * 5/1993 Moure et al. ..................... 429/49 X
5,491,037 2/1996 Kawakami ........................ 429/49
5,578,389 * 11/1996 Tsuchimoto et al. .............. 429/49
5,612,150 * 3/1997 Nishimura et al. ................ 429/49

FOREIGN PATENT DOCUMENTS

| 43 28 091 | 2/1995 | (DE) . |
| 44 24 825 | 1/1996 | (DE) . |
| 6-338353 * | 12/1994 | (JP) ............... H01M/10/54 |
| 62-29072 * | 2/1987 | (JP) ............... H01M/6/52 |
| WO 94/25167 | 11/1994 | (WO) . |
| 91/15036 * | 10/1991 | (WO) ............... H01M/10/54 |

* cited by examiner

Primary Examiner—Stephen Kalafut
(74) Attorney, Agent, or Firm—Fitzpatrick, Cella, Harper & Scinto

(57) ABSTRACT

A recovering process for recovering the constituent components of a sealed type battery comprising at least a cathode, an anode and an electrolyte sealed in a battery housing, characterized in that said process includes a step (a) of decreasing the ionic conductivity between said cathode and anode of said sealed type battery and a step (b) of opening said battery housing of the sealed type battery after conducting said step (a). An apparatus suitable for practicing said recovering process.

61 Claims, 10 Drawing Sheets

F I G. 3
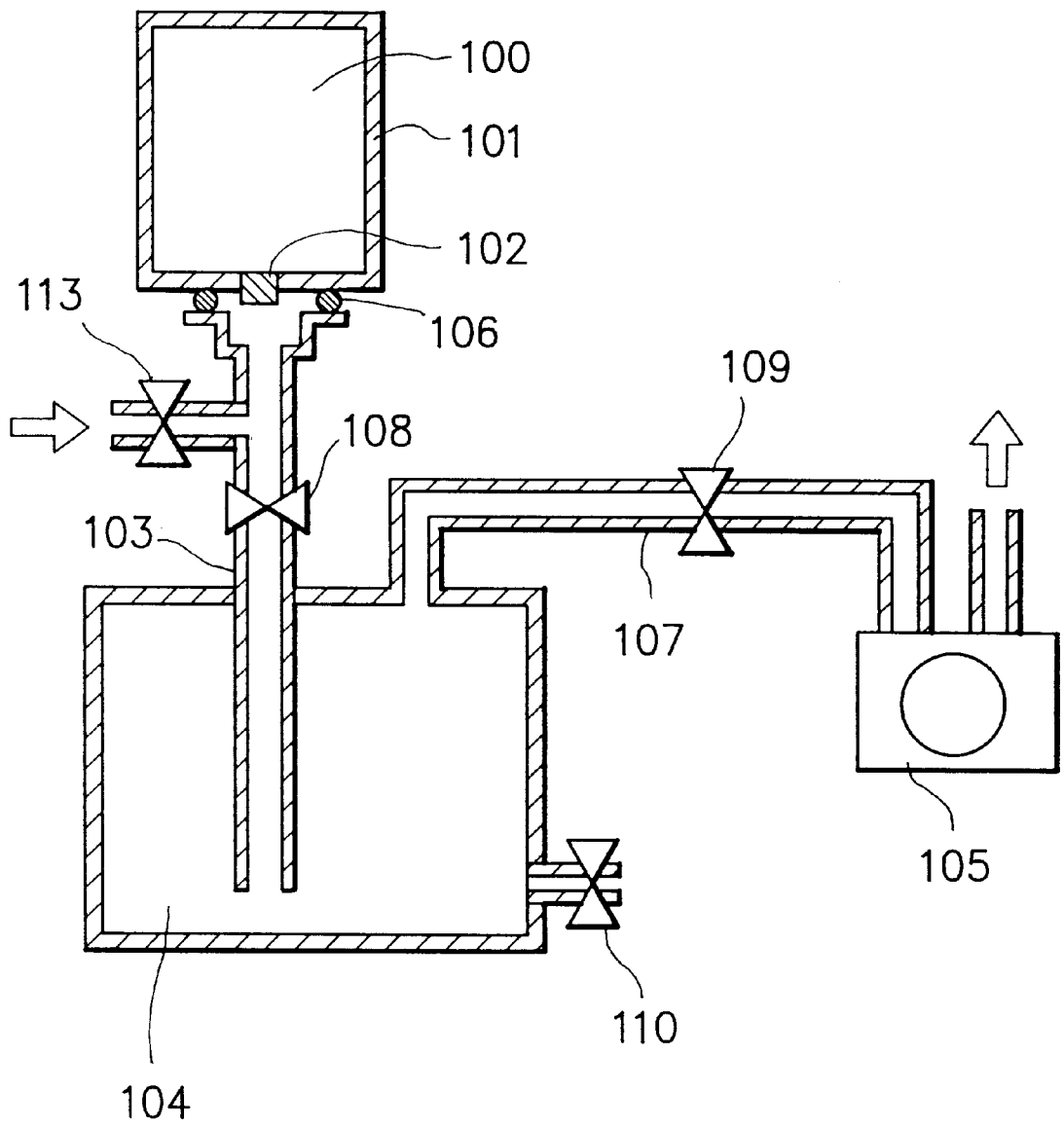

PROCESS AND APPARATUS FOR RECOVERING COMPONENTS OF SEALED TYPE BATTERY

BACKGROUND OF THE INVENTION

1. Field of the Invention

The present invention relates to a process and apparatus for recovering the constituent components of a sealed type battery. More particularly, the present invention relates to a process and apparatus for safely and efficiently opening a sealed type battery to recover the constituent components thereof.

2. Related Background Art

In recent years, global warming from the so-called greenhouse effect has been predicted due to the increased level of atmospheric $CO_2$. To prevent this warming phenomenon from further developing, there is a tendency to prohibit the construction of new steam-power generation plants which exhaust a large quantity of $CO_2$.

Under these circumstances, proposals have been made to institute load leveling in order to effectively utilize power. Load leveling involves the installation of rechargeable batteries at general locations to serve a storage for surplus power unused in the night, known as dump power. The power thus stored is available in the day time when the power demand is increased, leveling the load requirements in terms of power generation.

Separately, there is an increased societal demand for developing a high performance rechargeable battery with a high energy density for an electric vehicle which would not exhaust air polluting substances. There is further increased societal demand for developing a miniature, lightweight, high performance rechargeable battery usable as a power source for portable instruments such as small personal computers, word processors, video cameras, and pocket telephones.

For the batteries including rechargeable batteries for such uses as above mentioned, there have been developed various storage batteries including rechargeable batteries having an enclosed (or sealed) configuration. Specific examples of such a storage battery are a lead-acid battery, nickel-cadmium battery, nickel-metal hydride battery having a high energy density, nickel-zinc battery, rechargeable lithium battery and the like. In order for these storage batteries to have a long battery lifetime or/and to be ensured in terms of safety, there is usually employed a sealing manner with the use of a battery housing. In addition, in order to ensure further safety, these batteries are mostly provided with a safety vent. This safety vent serves to ensure the safety when the inside pressure of the battery housing is incidentally increased, by communicating the inside of the battery housing to the atmosphere outside the battery housing to thereby reduce the increased inside pressure of the battery housing.

Now, the nickel-metal hydride battery is a rechargeable battery in which electrochemical oxidation-reduction reaction of hydrogen ion is used. The nickel-metal hydride battery typically comprises an anode comprising an anode active material layer comprised of a hydrogen storage (absorbing) alloy, a cathode comprising a cathode active material layer comprised of nickel hydroxide (specifically, nickelous hydroxide), and an electrolyte solution. In this battery, when charging is operated, the hydrogen ion of the electrolyte solution at the side of the anode is reduced into hydrogen, followed by entering into the anode active material layer of the anode where the hydrogen is retained therein, and when discharging is operated, the hydrogen retained in the anode active material layer is oxidized into hydrogen ion, followed by incorporating into the electrolyte solution. For the cathode active material layer of the cathode, the constituent nickel oxyhydroxide is oxidized into a nickel oxide when charging is operated, and when discharging is operated, the nickel oxyhydroxide is reduced into the original nickel hydroxide. For the nickel-metal hydride battery, in order for the hydrogen storage alloy of the anode to efficiently retain hydrogen upon operating the charging and also in order to attain a high battery capacity, the components of the battery are usually sealed in a battery housing.

There are known various lithium batteries in which electrochemical oxidation-reduction reactions of lithium ion is used. In these lithium batteries, because lithium is readily reacted with moisture in the atmosphere to cause a decrease in the battery capacity, there are used an electrolyte solution in which a nonaqueous organic or inorganic solvent which is substantially free of moisture is used, and a battery housing capable of sufficiently sealing their components. And the fabrication of these batteries is conducted in an atmosphere which is sufficiently free of moisture.

Specific examples of these lithium batteries include commercially available primary lithium batteries, commercially available so-called lithium ion batteries, and rechargeable lithium metal batteries (which have been put into the research or which are under development). In the primary lithium battery and rechargeable lithium metal batteries, their anodes have an anode active material layer comprising a lithium metal.

In the lithium ion battery, as the anode active material layer, there is used a carbonous material such as graphite capable of intercalating lithium ion into the network planes of the carbonous material when charging is operated, and as the cathode, there is used a transition metal compound capable of intercalating lithium ion into the transition metal compound when discharging is operated.

Incidentally, the foregoing storage batteries including rechargeable batteries enclosed by such battery housing as above described are used in various portable instruments. For these sealed type batteries, to recover them and to recycle their components is essential not only in terms of development of new portable instruments but also in viewpoints that they are expected to be further developed in the future so that they can be used in electric vehicles, load conditioners, power storage, or the like, and also in a viewpoint that the consumption of the batteries is expected to greatly increase in the future.

However, in order to recover the components of these sealed type batteries, it is necessary to firstly open their battery housings. In this case, problems are liable to occur in that upon the opening, the cathode is often contacted with the anode to cause internal shorts between the two electrodes, where the residual electric capacity is suddenly consumed within a short period of time to cause heat generation, resulting in deteriorating the battery components such that they cannot be recycled. Because of this, there cannot be attained a desirable recovery for the battery components.

In this respect, for the sealed type batteries, there is an increased demand for developing a recovering process including an opening process which enables the efficient recovery of their components without being damaged or deteriorated even in the case where their cathode and anode are contacted with each other upon the opening.

SUMMARY OF THE INVENTION

The present invention has been accomplished in view of the foregoing situation in the prior art.

An object of the present invention is to provide a recovering process which enables the safe and efficient recovery of the components of a sealed type battery without the components being damaged or deteriorated.

Another object of the present invention is to provide a recovering apparatus which enables the safe and efficient recovery of the components of a sealed type battery without the components being damaged or deteriorated.

A first aspect of the present invention lies in a recovering process for recovering the components of a sealed type battery sealed, comprising at least a step of decreasing the ionic conductivity between the cathode and anode and a step of opening the battery housing.

A second aspect of the present invention lies in a recovering apparatus for recovering the components of a sealed type battery, comprising at least a means for decreasing the ionic conductivity between the cathode and anode and a means for opening the battery housing.

BRIEF DESCRIPTION OF THE DRAWINGS

FIG. 3 is a schematic diagram illustrating the constitution of an example of an apparatus suitable for extracting an electrolyte solution or a solvent thereof present in a sealed type battery to decrease the ionic conductivity between the cathode and anode in the sealed type battery prior to opening the sealed type battery, which is used as a part of the recovering apparatus according to the present invention.

DESCRIPTION OF THE INVENTION AND PREFERRED EMBODIMENTS

Figure 1:
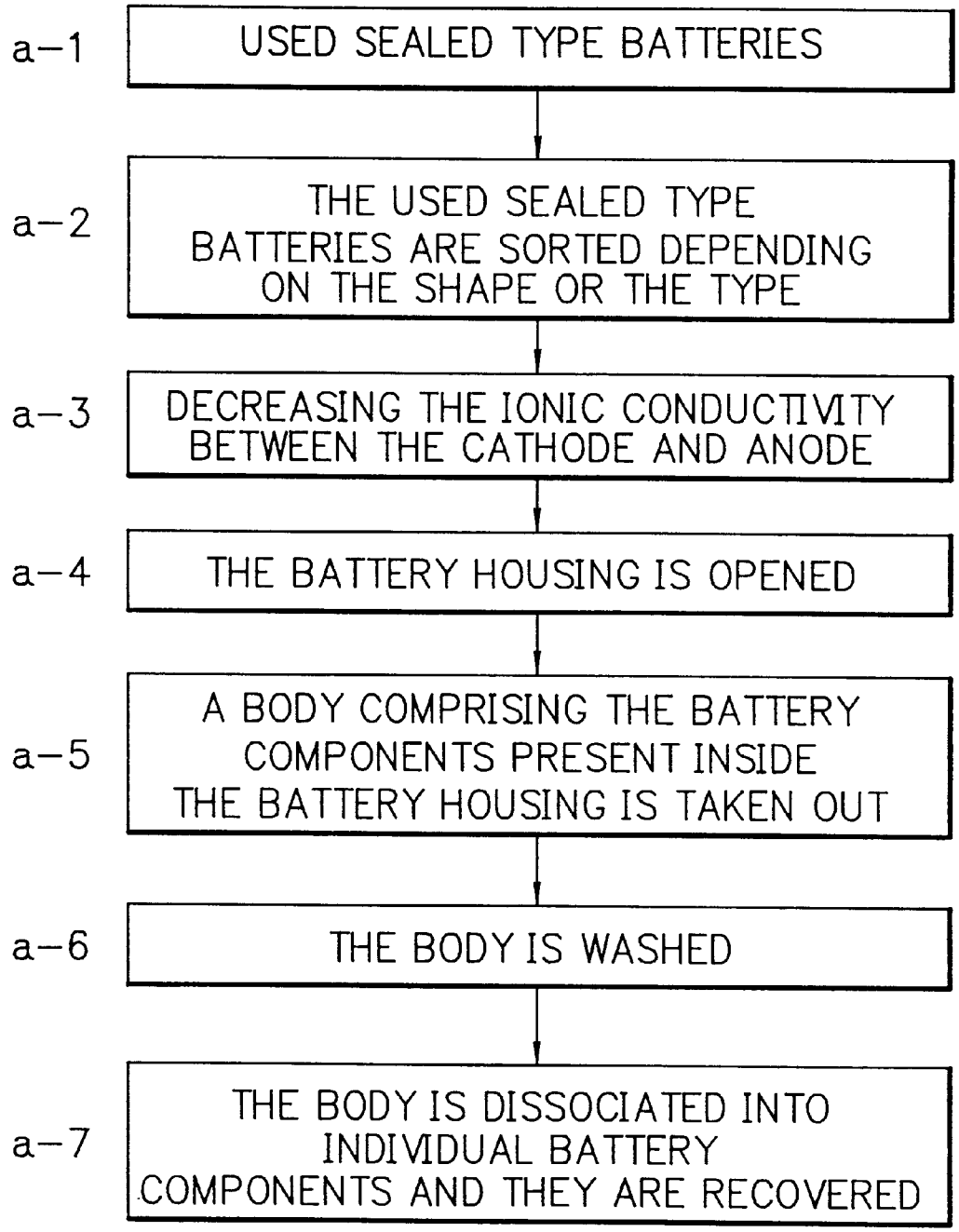
FIG. 1 is a schematic flow diagram illustrating an example of the recovering process for recovering the components of an sealed type battery according to the present invention.

As previously described, the present invention includes a recovering process for recovering the components of a sealed type-battery sealed, comprising at least a step of decreasing the ionic conductivity between the cathode and anode and a step of opening the battery housing; and a recovering apparatus for recovering the components of a sealed type battery, comprising at least a means for decreasing the ionic conductivity between the cathode and anode and a means for opening the battery housing.

A principal feature of the recovering process is that prior to opening the sealed type battery, the ionic conductivity between the cathode and anode is decreased. Similarly, a principal feature of the recovering apparatus according to the present invention is to have a specific means for decreasing the ionic conductivity between the cathode and anode prior to opening the enclosed type battery.

In the present invention, by extracting the electrolyte solution or the solvent of the electrolyte solution outside the sealed type battery to decrease the ionic conductivity between the cathode and anode prior to opening the battery housing of the sealed type battery, even in the case where internal shorts would have occurred between the cathode and anode when the battery housing is opened or the battery components are taken out from the inside of the battery housing as will be described later, the occurrence of sudden energy release and combustion due to internal shorts is effectively prevented. As a result, it is possible to safely recover the battery components without their being deteriorated or destroyed. Thus, there can be realized safe recovery of the components of the sealed type battery at a high recovery rate.

The recovering process and apparatus according to the present invention are effective in recovering the components of any sealed type batteries including sealed type primary and secondary (rechargeable) batteries, notwithstanding the kind of a battery enclosed therein.

Specific examples of such sealed type battery for which the recovering process and the recovering apparatus according to the present invention are particularly effective in recovering the battery components are lithium batteries including lithium ion rechargeable batteries (in which an anode comprising a carbonous material capable of intercalating lithium ion is used) in which electrochemical oxidation-reduction reaction of lithium ion is used; nickel-metal hydride rechargeable batteries having an anode comprising a hydrogen storage alloy and in which electrochemical oxidation-reduction reaction of hydrogen ion is used; and nickel-cadmium batteries.

Herein, for the lithium batteries, a variety of enclosed type primary lithium batteries having an anode comprising a lithium metal have been frequently used in portable instruments such as cameras, wristwatches and the like. And the consumption of these primary lithium batteries are expected to further increase in the future. In addition, the consumption of rechargeable lithium batteries is expected to increase in the future. Under this circumstance, the waste disposal of these lithium batteries will be possibly a serious problem in the future as well as in the case of other batteries. In this respect, it is an urgent necessity of recovering and recycling their components such as anodes, cathodes, electrolytes, separators, and housings.

Now, in order to separately recover the components of a used sealed type lithium battery, the battery housing is required to be opened while preventing external moisture invasion, which will be a cause of damaging or deteriorating the battery characteristics.

As a most simple manner for unsealing the battery housing of an enclosed type battery, there is considered a mechanically cutting manner. However, when this manner is employed particularly in the case of an enclosed type lithium battery, problems are liable to occur in that as the energy per unit volume and unit weight is extremely high and a combustible material such as organic solvent is contained, a spark is generated or internal shorts occur between the anode and cathode upon mechanically cutting the battery housing, where the components are damaged or deteriorated. Besides, other problems are liable to occur, as described below. When the battery components situated inside the battery housing are taken out after the battery housing has been unsealed, the anode and cathode are close to each other and they tend to internally short. When these internal shorts occur, the residual battery energy is released rapidly to cause sudden heat generation.

Therefore, particularly for a sealed type lithium battery, there is demand for developing a desirable recovering process and a desirable recovering apparatus capable of recovering the battery components without being damaged or deteriorated for dealing with an increase in the consumption thereof.

The present invention desirably meets this demand.

In the recovering process for recovering the components of a sealed type battery which comprises an electrolyte solution as the electrolyte, the step of decreasing the ionic conductivity between the. cathode and anode is desired to be conducted by a manner of extracting the electrolyte solution or the solvent thereof present within the battery housing outside the battery housing. In the case where the enclosed battery is provided with a safety vent, to extract the electrolyte solution or the solvent thereof outside the battery housing is desired to be conducted while taking advantage of the safety vent in view of working efficiency, for instance, in a manner wherein through the safety vent, the pressure of the atmosphere outside the battery housing is decreased to increase the inside pressure of the battery housing whereby causing a differential pressure between the outside and the inside of the battery housing, and by this, the safety vent is actuated to extract the electrolyte solution or the solvent thereof outside the battery housing. The electrolyte solution or the solvent thereof thus extracted outside the battery housing can be recycled.

In the recovering process for recovering the components of a sealed type battery, the step of decreasing the ionic conductivity between the cathode and anode is desired to be conducted at least through a manner of cooling the enclosed type battery. In the case where this manner is employed, when a solvent is used in the electrolyte solution of the sealed type battery, it is desired to cool the sealed type battery to a temperature which is lower than the freezing point of the solvent. In the case where a solid polymer electrolyte solidified by using a polymer is used in the sealed type battery, it is desired to cool the sealed type battery to a temperature which is lower than the glass transition temperature of the constituent polymer of the solid polymer electrolyte.

The above manner of cooling the sealed battery can be conducted by a cooling manner of cooling an object using an incombustible compressed gas comprising one or more gases selected from the group consisting of $N_2$ gas, Ar gas, He gas, $CO_2$ gas and fluorocarbon gas.

Besides this, it is possible for the above manner of cooling the sealed type battery to be conducted by a manner of cooling the sealed type battery by immersing it in a cooling agent or a liquefied gas. The cooling agent can include, for example, a mixture comprising dry ice and methanol and a mixture comprising dry ice and ethanol. The liquefied gas can include, for example, liquid nitrogen and the like.

Alternatively, it is possible for the above manner of cooling the sealed type battery to be conducted by a manner of immersing the sealed type battery in water, followed by freezing the enclosed type battery together with the water. In this case, the sealed type battery is desired to be opened in a state in that the sealed type battery is sealed in the ice.

In the recovering process for recovering the components of a sealed type battery, it is desired for the step of opening the battery housing after the ionic conductivity between the cathode and anode has been decreased to be conducted in an incombustible atmosphere. In this case, there are provided advantages in that the battery components are prevented from being oxidized or combusted and they can be safely recovered while desirably preventing them from being damaged or deteriorated at a high recovery. The above incombustible atmosphere may be an atmosphere composed of one or more gases selected from the group consisting of $N_2$ gas, Ar gas, He gas, $CO_2$ gas, fluorocarbon gas, and steam. In the case where the foregoing cooling manner using the incombustible compressed gas is employed in the step of decreasing the ionic conductivity between the cathode and anode, the gas used to constitute the atmosphere for opening the battery housing is desired to be the same as the gas used as the compressed gas.

As the manner of opening the battery housing, there can be illustrated a cutting process using a high pressure water, a cutting process using an energy beam, a mechanically cutting process, and a cutting process by way of spraying a high pressure water containing an abrasive mixed therein on an object through a jet nozzle.

In the present invention, by subjecting the battery to discharging prior to opening the housing of the sealed type battery, preferably at a stage before decreasing the ionic conductivity between the cathode and anode, opening the sealed type battery can be more safely conducted. In this case, the chemical composition of the constituent material for each of the cathode and anode active material layers becomes uniform without depending upon the residual battery capacity before the discharging, where the cathode material and the anode material each having a satisfactory uniformity in terms of the chemical composition can be recovered. Further in this case, by means of the discharging, it is possible to withdraw the energy remained in the enclosed battery.

Further in the present invention, by sorting the sealed batteries depending on the shape or the type before their housings are unsealed, their components can be efficiently recovered.

As previously described, the recovering apparatus according to the present invention for recovering the components of a sealed type battery sealed by a battery housing, comprises at least a means for decreasing the ionic conductivity between the cathode and anode and a means for opening the battery housing.

The means for decreasing the ionic conductivity between the cathode and anode is desired to comprise at least a means for extracting the electrolyte solution or the solvent thereof present inside the battery housing outside the battery housing. In the case where the sealed type battery is provided with a safety vent, this means is desired to have a function of actuating the safety vent, for instance, by decreasing the pressure of the atmosphere outside the battery housing to increase the inside pressure of the battery housing across the safety vent whereby causing a differential pressure between the outside and the inside of the battery housing and a means for extracting the electrolyte solution or the solvent thereof present inside the battery housing outside the battery housing through the safety vent. The means for extracting the electrolyte solution or the solvent thereof present inside the battery housing outside the battery housing is desired to comprise a vessel provided with at least an exhaust means. It is desired for the vessel in this case to be provided with a member which can be close-contacted with or joined to the battery housing's exterior wall face including a portion of the battery capping in the neighborhood of the safety vent and an opening (or a passage) for transferring the electrolyte solution or the solvent thereof (which is extracted from the battery) into the vessel.

In the above described vessel, a port capable of introducing air, nitrogen gas ($N_2$) or inert gas there into may be provided through a valve.

In the recovering apparatus according to the present invention, for instance, by establishing a closed or sealed space with a part of the battery housing's exterior face including the battery capping or the entirety thereof (including the portion through which the electrolyte solution or the solvent thereof is extracted) and the above described vessel and decreasing the inner pressure of the sealed space with respect to the inner pressure of the enclosed battery while maintaining the safety vent portion in the sealed space, the electrolyte solution or the solvent present inside the battery housing can be desirably recovered into the vessel through the safety vent.

In the recovering apparatus according to the present invention, the above closed (sealed) space is desired to be established by connecting the above vessel provided with the exhaust means to a region including a portion (e.g., the safety vent) through which the electrolyte solution or the solvent thereof present inside the battery housing is extracted after the inner pressure of the above vessel has been decreased with respect to the atmospheric pressure by means of the exhaust means provided at the vessel.

In the recovering apparatus according to the present invention, it is possible that the above closed space is first established by the above and thereafter, the inner pressure of the sealed space is lowered with respect to the inner pressure of the sealed battery by means of the above exhaust means provided at the vessel.

In the recovering apparatus according to the present invention, the foregoing means for decreasing the ionic conductivity between the cathode and anode is desired to comprise a cooling means for cooling the sealed type battery.

Cooling the sealed type battery by means of the cooling means is desirably accomplished by using an incombustible compressed gas comprising one or more gases selected from the group consisting of $N_2$ gas, Ar gas, He gas, $CO_2$ gas and fluorocarbon gas in the cooling means.

Alternatively, cooling the enclosed battery by means of the cooling means may be conducted by using a cooling agent or a liquefied gas in the cooling means. The cooling agent can include, for example, a mixture comprising dry ice and methanol and a mixture comprising dry ice and ethanol. The liquefied gas can include, for example, liquid nitrogen and the like.

Further, it is possible that the sealed type battery is immersed in water, followed by freezing the sealed type battery together with the water. In this case, the sealed type battery is desired to be opened in a state in that the enclosed battery is sealed in the ice.

In the recovering apparatus according to the present invention, as the means for unsealing the battery housing, there can be illustrated a cutting means using a high pressure water, a cutting means using an energy beam, a mechanically cutting means, and a cutting means using a high pressure water containing an abrasive mixed therein.

Opening the battery housing by any of these cutting means is desirably conducted in an incombustible atmosphere. The incombustible atmosphere may be an atmosphere composed of one or more gases selected from the group consisting of $N_2$ gas, Ar gas, He gas, $CO_2$ gas, fluorocarbon gas, and steam.

In the following, preferred embodiments of the present invention will be described while referring to the drawings.

FIG. 1 is a schematic flow diagram illustrating an example of the recovering process for recovering the components of a sealed type battery according to the present invention.

Description will be made of an embodiment of the recovering process according to the present invention with reference to FIG. 1.

In order to efficiently recover the components of a sealed type battery, used sealed type batteries (FIG. 1(a-1)) collected for recovering their components are first sorted depending on the shape or the type (see, FIG. 1(a-2)).

Then, the sealed type battery thus sorted is subjected to a decrease in the ionic conductivity between the anode and cathode (see, FIG. 1(a-3)). In this case, decreasing the ionic conductivity between the cathode and anode may be conducted by the foregoing manner of extracting the electrolyte solution or the solvent thereof present between the cathode and anode (in the case of using the electrolyte solution as the electrolyte in the battery) outside the battery housing through the safety vent or the like annexed to the battery housing. Alternatively, it may be conducted by the foregoing manner of cooling the battery to decrease the ionic conductivity between the cathode and anode.

Thereafter, the battery housing is opened (see, FIG. 1(a-4)), followed by taking out a body comprising the battery components present inside the battery housing (see, FIG. 1(a-5)).

The body thus taken out is washed (see, FIG. 1(a-6). Then, the body is dissociated (separated) into individual battery components and the battery components thus dissociated are recovered (see, FIG. 1(a-7)).

Figure 2:
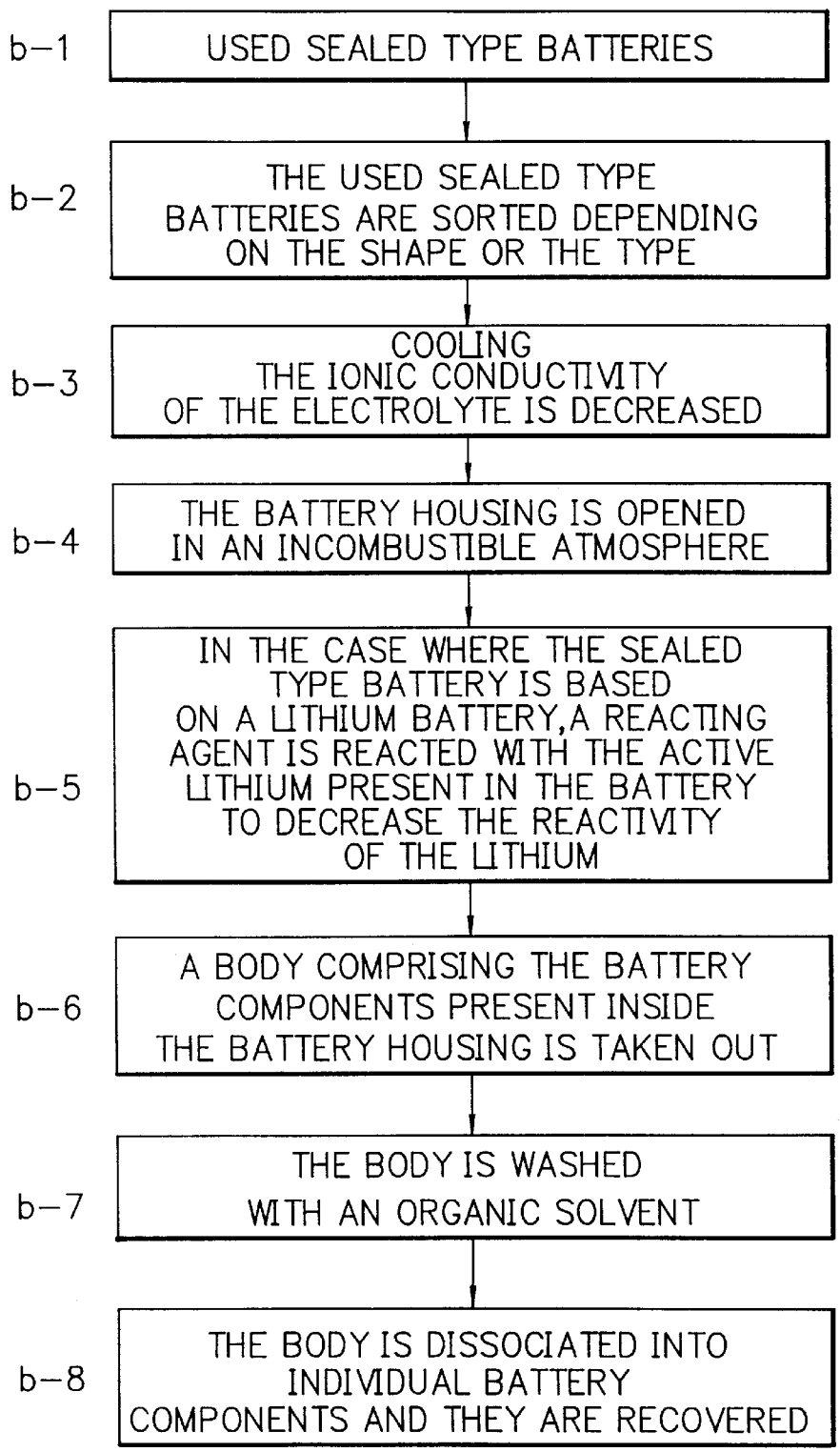
FIG. 2 is a schematic flow diagram illustrating another example of the recovering process for recovering the components of a sealed type battery according to the present invention.

FIG. 2 is a schematic flow diagram illustrating an other example of the recovering process for recovering the components of a sealed type battery according t o the present invention.

Description will be made of another embodiment of the recovering process according to the present invention with reference to FIG. 2.

In order to efficiently recover the components of each used sealed type battery, used sealed type batteries (FIG. 2(b-1)) collected for recovering their components are first sorted depending on the shape or the type (see, FIG. 2(b-2)).

Then, the sealed type battery thus sorted is cooled to decrease the ionic conductivity between the anode and cathode whereby increasing the internal resistance (see, FIG. 2(b-3)).

Thereafter, the battery housing of the sealed type battery thus cooled in the above step is opened in an incombustible atmosphere (see, FIG. 2(b-4)).

Then, in the case where the battery in the sealed type battery is based on a lithium battery, an appropriate reacting agent is reacted with the active lithium present inside the battery housing to decrease the reactivity of the lithium (see, FIG. 2(b-5)).

Next, a body comprising the battery components present inside the battery housing is taken out (see, FIG. 2(b-6)).

In the case where the electrolyte is in the liquid state, the body (comprising the battery components) thus taken out is washed with an appropriate organic solvent (see, FIG. 2(b-7)).

Then, the body thus washed is dissociated into individual battery components and the battery components thus dissociated are recovered (see, FIG. 2(b-8)).

If necessary, the residual electric capacity in the used sealed battery may be discharged after sorting the battery, whereby the steps of opening the battery housing, dissociating the battery into individual components and recovering the components may be conducted more safely. Specific examples of the manner for doing this include a manner wherein the anode and cathode terminals of the battery are electrically connected to a capacitor to conduct discharging and a manner wherein charging is conducted by connecting a resistance between the anode and cathode terminals of the battery. In any case, the charging is conducted until the electric capacity of the battery decreases suddenly.

In the following, with reference to the drawings, description will be made of the foregoing manner of extracting the electrolyte or the solvent thereof present inside the battery housing as a measure for decreasing the ionic conductivity between the cathode and anode in a sealed type battery.

FIG. 3 is a schematic diagram illustrating the constitution of an example of an apparatus suitable for extracting an electrolyte solution or a solvent thereof present in a sealed type battery to decrease the ionic conductivity between the cathode and anode in the sealed type battery prior to opening the housing of the sealed type battery, which is used as a part of the recovering apparatus according to the present invention.

Figure 4:
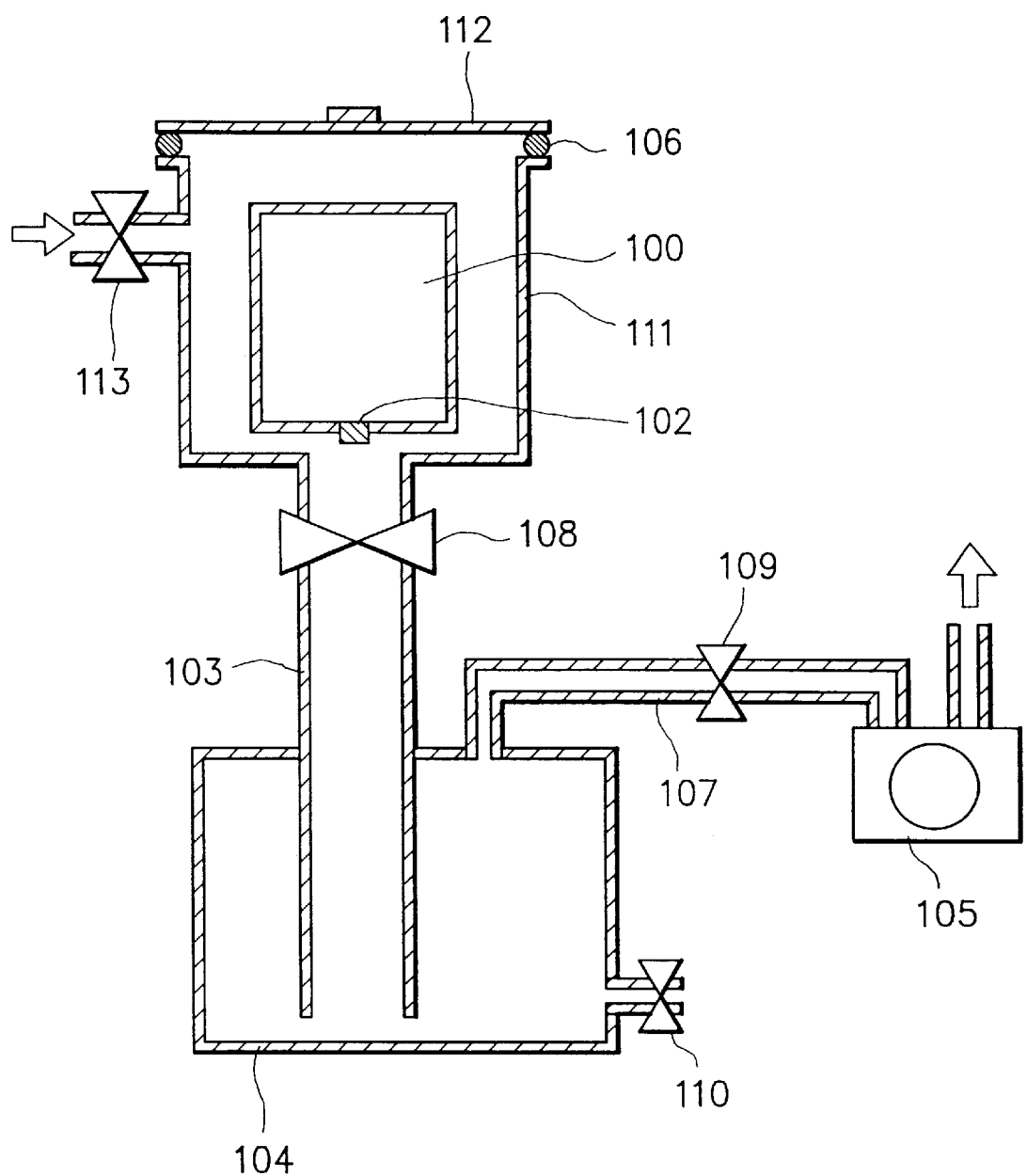
FIG. 4 is a schematic diagram illustrating the constitution of another example of an apparatus for extracting an electrolyte solution or a solvent thereof present in a sealed type battery to decrease the ionic conductivity between the cathode and anode in the sealed type battery prior to opening the enclosed battery, which is used as a part of the recovering apparatus according to the present invention.

FIG. 4 is a schematic diagram illustrating the constitution of another example of an apparatus suitable for extracting an electrolyte solution or a solvent thereof present in a sealed type battery to decrease the ionic conductivity between the cathode and anode in the sealed type battery prior to opening the housing of the sealed type battery, which is used as a part of the recovering apparatus according to the present invention.

Each of the apparatuses shown in FIGS. 3 and 4 corresponds to an example of a system used in the foregoing recovering apparatus, for extracting the electrolyte solution or the solvent thereof through the safety vent or the like to decrease the ionic conductivity between the cathode and anode in the sealed type battery prior to opening the housing of the sealed type battery while recovering the electrolyte solution or the solvent thereof.

In the case of the apparatus shown in FIG. 3, the apparatus is contacted through its specific contact means with a sealed type battery having a safety vent such that the apparatus is tightly contacted with a portion of the battery housing's exterior wall of the sealed type battery in the neighborhood of the safety vent and the neighborhood of the safety vent is locally depressurized to cause a differential pressure between the outside and the inside of the battery housing. By this, the safety vent is actuated to communicate the outside and the inside of the battery housing whereby the electrolyte or the solvent thereof present inside the battery housing is extracted.

In the case of the apparatus shown in FIG. 4, the apparatus is provided with a specific vessel capable of being vacuumed. An enclosed type battery is placed in the vessel, and the inside (containing the enclosed type battery) of the vessel is depressurized to relatively increase the internal pressure of the sealed type battery whereby causing a differential pressure between the outside and the inside of the battery housing. By this, the safety vent is actuated to communicate the outside and the inside of the battery housing whereby the electrolyte or the solvent thereof present inside the battery housing is extracted.

Description will be made of the apparatus shown in FIG. 3 and its operation.

In FIG. 3, reference numeral 100 indicates an enclosed type battery sealed in a battery housing 101. Reference numeral 102 indicates a safety vent annexed to the enclosed type battery.

Reference numeral 103 indicates an extraction pipe for extracting an electrolyte solution or a solvent of said electrolyte solution from the battery 100. The extraction pipe 103 is provided with a switching valve 108 serving as an extraction valve for an electrolyte or a solvent of said electrolyte solution, and it is also provided with a gas supply pipe for introducing air, nitrogen gas or inert gas into the apparatus. The gas supply pipe is provided with a leak valve 113.

Reference numeral 104 indicates a storage tank for storing the electrolyte solution or the solvent thereof extracted from the enclosed type battery 100 through the extraction pipe 103.

Reference numeral 105 indicates a vacuuming means comprising a vacuum pump or the like which is connected to the storage tank 104 through an exhaust pipe 107 provided with an exhaust valve 109. Reference numeral 106 indicates an O-ring for attaining a tight contact. Reference numeral 110 indicates a drain valve provided at the storage tank 104.

Particularly, in the apparatus shown in FIG. 3, the extraction pipe 103 has a first opening portion provided with the O-ring 106, a second opening portion open into the storage tank 104, and a gas introduction opening portion through which air, nitrogen gas or incombustible gas supplied through the gas supply pipe provided with the leak valve 113 can be introduced into the inside of the apparatus. Said first opening portion is situated at an exterior wall portion of the battery housing 101, said exterior wall portion including the neighborhood of the safety vent 102 of the sealed battery 100, and said neighborhood including a portion of a battery capping or lid (not shown) of the battery 100. Particularly, the first opening portion is tightly contacted with or joined to said exterior wall portion of the battery housing 101 through the O-ring 106 as shown in FIG. 3. And as above described, the second opening portion of the extraction pipe 103 is open into the storage tank 104. By this, the battery 100 is communicated with the inside of the storage tank 104 through the extraction pipe 103.

In the above system, there is established a space comprising the above described battery housing's exterior wall portion (including the safety vent 102 of the battery 100), the inside of the extraction pipe 103 and the inside of the storage tank 104. Herein, the battery 100 is arranged such that its portion having the safety vent 102 downwardly faces as shown in FIG. 3. By means of the vacuuming means 105 connected through the exhaust pipe 107 provided with the exhaust valve 109 to the storage tank 104, the inside of the system is depressurized to make the above space have an internal pressure which is lower than that of the battery 100. By this, the safety vent 102 is actuated (opened in other words), where the electrolyte solution or the solvent thereof contained in the battery 100 is extracted into the extraction pipe 103, followed by flowing into the storage tank 104. As a result, there is provided a situation in that no electrolyte solution is present between the cathode and anode (not shown) in the battery 100 and the ionic conductivity between the two electrodes is decreased.

In the above operation, if necessary, it is possible that the leak valve 113 of the gas supply pipe is actuated to introduce air, nitrogen gas or inert gas into the system.

For the electrolyte solution or the solvent thereof extracted into the storage tank 104, a predetermined amount thereof is periodically drained by actuating the drain valve 110 to the outside, followed by recovering. The electrolyte solution or the solvent thereof thus recovered may be recycled.

In the following, description will be made of the apparatus shown in FIG. 4 and its operation.

The apparatus shown in FIG. 4 comprises a battery container 111 provided with a extraction pipe 103 which is extended into a storage tank 104. The battery container 111 serves to house a sealed type battery 100 having a safety vent 102 to be treated. The extraction pipe 103 serves to extract an electrolyte solution or a solvent of said electrolyte solution contained in the sealed type battery 100. The extraction pipe 103 has an opening at one end thereof which is open into the battery container 111 and another opening at the other end thereof which is open into the storage tank 104. The extraction pipe 103 is provided with a switching valve 108 serving as an extraction valve for the electrolyte solution or the solvent thereof.

The storage tank 104 serves to store the electrolyte solution or the solvent thereof which is extracted from the battery 100 through the extraction pipe 103. The inside of the storage tank 104 is connected to a vacuuming means 105 comprising a vacuum pump or the like through an exhaust pipe 107 provided with an exhaust valve 109.

The battery container is provided with a gas supply pipe provided with a leak valve 113, which serves to introduce air, nitrogen gas or inert gas into the battery container 111. Reference numeral 112 indicates a capping for the battery container 111. The capping 112 is tightly capped to the battery container 111 by means of an O-ring 106.

In the above system, there is established a space comprising the capping 112, the inside of the battery container 111, the entire of the battery housing's exterior wall including the safety vent 102, the inside of the extraction pipe 103 and the inside of the storage tank 104. Herein, the battery 100 is arranged such that its portion having the safety vent 102 downwardly faces as shown in FIG. 4. By means of the vacuuming means 105, the inside of the system (from the extraction pipe 103 through the storage tank) is depressurized to make the above space have an internal pressure which is lower than that of the battery 100. By this, the safety vent 102 is actuated (opened in other words), where the electrolyte solution or the solvent thereof contained in the battery 100 is extracted into the extraction pipe 103, followed by flowing into the storage tank 104. As a result, there is provided a situation in that no electrolyte solution is present between the cathode and anode (not shown) in the battery 100 and the ionic conductivity between the two electrodes is decreased.

In the above operation, if necessary, it is possible that the leak valve 113 of the gas supply pipe is actuated to introduce air, nitrogen gas or inert gas into the system.

For the electrolyte solution or the solvent thereof extracted into the storage tank 104, a predetermined amount thereof is periodically drained by opening the drain valve 110 to the outside, followed by recovering. The electrolyte solution or the solvent thereof thus recovered may be recycled.

For the sealed type battery from which the electrolyte solution or the solvent thereof has been extracted in the system shown in FIG. 3 or 4 as above described, its housing is opened by an appropriate unsealing manner in a state in that the ionic conductivity between the cathode and anode has been decreased, and the battery components are recovered.

In the following, description will be made of an embodiment of the step of increasing the internal resistance of a sealed type battery by cooling the battery and an embodiment of the step of opening the housing of said cooled battery in the process for recovering the components of a sealed type battery by decreasing the ionic conductivity between the cathode and anode in the sealed type battery, while referring to an apparatus shown in FIG. 5 having a system capable of conducting these steps.

Figure 5:
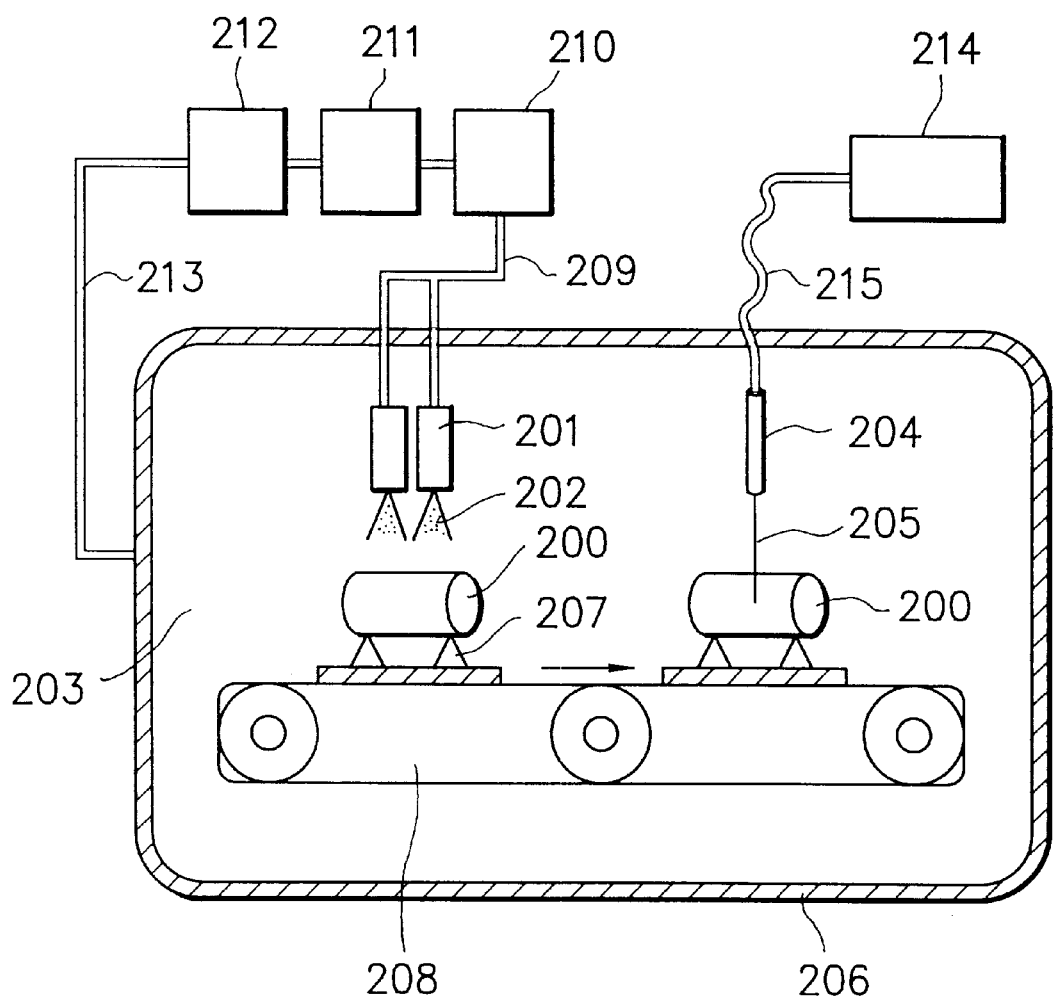
FIG. 5 is a schematic conceptual view illustrating an apparatus portion as a principal portion of the recovering apparatus according to the present invention, comprising a cooling means and an unsealing (opening) means.

FIG. 5 is a schematic conceptional view illustrating an example of an apparatus for cooling a sealed type battery and opening its battery housing as a part of the recovering apparatus according to the present invention for recovering the components of a sealed type battery.

In the apparatus shown in FIG. 5, there is shown a case wherein a cooling apparatus capable of cooling a sealed type battery by using a compressed incombustible gas, and the same incombustible gas used as an atmosphere under which to unseal the battery housing is provided. The apparatus shown in FIG. 5 is provided with a means for recovering the gas used for cooling the enclosed type battery, purifying the recovered gas and recycling the purified gas. In the apparatus shown in FIG. 5, in order to open the battery housing, a high pressure water or energy beam is used.

The apparatus shown in FIG. 5 and its operation will be detailed.

In FIG. 5, reference numeral 200 indicates an enclosed type battery, reference numeral 201 a cooling apparatus (a low temperature gas-blowing apparatus), reference numeral 202 a low temperature gas, reference numeral 203 an incombustible atmosphere, reference numeral 204 an unsealing apparatus for a battery housing, reference numeral 205 a high pressure water or energy beam, reference numeral 206 a partition wall, reference numeral 207 a fixing table for an enclosed type battery, reference numeral 208 a transportation mechanism for an enclosed type battery, reference numeral 209 a gas feed pipe for a m; compressed gas, reference numeral 210 a compressor, reference numeral 211 a removing device for removing impurities such as water, reference numeral 212 an incombustible gas-recovering device, reference numeral 213 a gas pipe for recovering an incombustible gas, reference numeral 214 a generation device for generating a high pressure water or energy beam, and reference numeral 215 a transfer pipe for a high pressure water or a transmission pipe for an energy beam.

In the apparatus shown in FIG. 5, a used, sealed type battery 200 is fixed onto the fixing table 207 arranged on transportation mechanism 208 provided in the chamber demarcated by the partition wall 206. The battery 200 is sequentially transported to the cooling step zone having the cooling apparatus 201 then to the unsealing step zone having the unsealing apparatus 204. The chamber space demarcated by the partition wall 206 including the zone of the cooling apparatus 201 and the zone of the unsealing apparatus is filled with an incombustible gas (the incombustible atmosphere 203).

At the cooling apparatus 201, a low temperature gas 202 comprising a cooled incombustible gas is supplied to the enclosed type battery 200 to cool the electrolyte contained in the enclosed battery whereby decreasing its ionic conductivity. As the low temperature gas 202 used herein, it is desired that the incombustible gas inside the partition wall 206 is recycled. Particularly in this respect, said incombustible gas is recovered by the incombustible gas-recovering device 212 through the gas conduit 213 connected to the chamber demarcated by the partition wall 206, purified by the impurities-removing device 211, compressed by the compressor 210, supplied to the cooling apparatus 201, followed by supplying to the enclosed type battery 200 as the low temperature gas 202 (the compressed gas).

In the above cooling step for cooling the enclosed type battery, it is possible to cool the sealed type battery, for example, by using a cooling agent or liquefied gas. Alternatively, cooling the sealed type battery may be accomplished by a manner wherein the sealed type battery is immersed in water, followed by freezing the water together with the battery such that the battery is sealed in the ice.

Then, at the unsealing apparatus 204, for example, a high pressure water or energy beam 205 is effected to the sealed type battery 200 having been cooled in the above cooling step to open the battery housing. The high pressure water or energy beam used herein is produced by the generation device 214, followed by supplying to the unsealing apparatus 204 through the transfer pipe or transmission pipe 215.

In the following, description will be made of detailed conditions in the cooling step for cooling an enclosed type battery, said cooling step including the foregoing cooling step using the apparatus shown in FIG. 5.

Cooling Temperature

Description will be made of the cooling temperature to which an enclosed type battery is cooled in order to decrease the ionic conductivity of the electrolyte.

For instance, when the sealed type battery is a sealed type lithium battery in which an electrolyte solution comprising an electrolyte and an organic solvent is used as the electrolyte, in order to decrease the ionic conductivity of the electrolyte, the lithium battery is desired to be cooled to a temperature which is lower than the freezing temperature of the organic solvent of the electrolyte solution.

When the electrolyte of the lithium battery comprises a polymer solid electrolyte solidified by using a polymer, in order to decrease the ionic conductivity of the electrolyte, the lithium battery is desired to be cooled to a temperature which is lower than the glass transition temperature of the polymer of the polymer solid electrolyte.

Specifically, the range of the cooling temperature is preferably 0° C. or less, more preferably −20° C. or less.

In the case where the sealed type battery is another sealed type battery such as sealed type metal hydride battery, sealed type nickel-cadmium battery, sealed type lead-acid battery, or the like, the cooling temperature for these batteries is desired to be in the above described temperature range.

Cooling Means

Description will be made of the cooling means for cooling a sealed type battery in order to decrease the ionic conductivity of the electrolyte.

Cooling a sealed type battery in order to decrease the ionic conductivity of the electrolyte may be conducted with the use of a compressed gas comprising an incombustible gas (by using an appropriate cooling apparatus such as the cooling apparatus 201 shown in FIG. 5), or with the use of a liquefied gas or a cooling agent.

Figure 6:
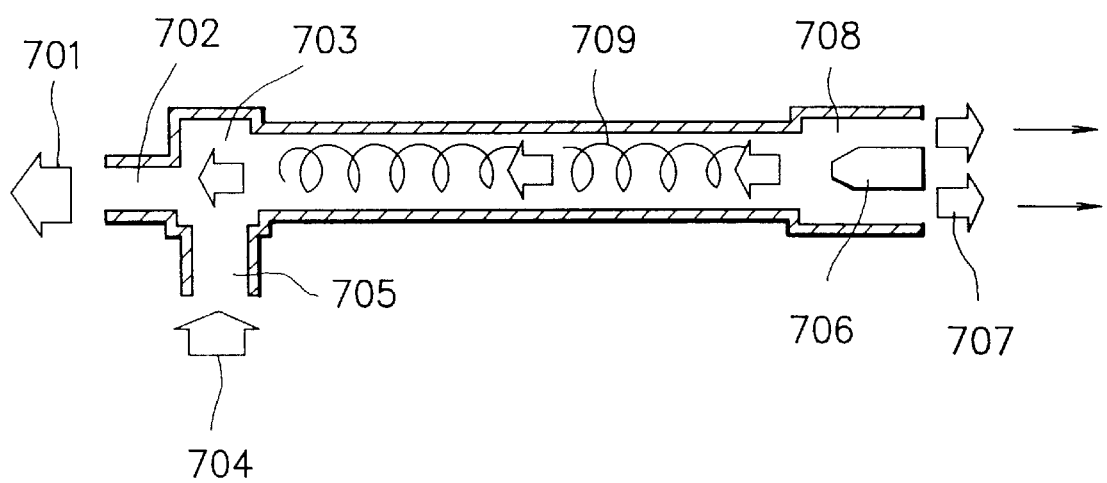
FIG. 6 is a schematic diagram of an example of a cooling means used in the recovering apparatus according to the present invention.

The cooling manner with the use of a compressed gas comprising an incombustible gas may be conducted also by using a cooling apparatus as shown in FIG. 6. The cooling apparatus shown in FIG. 6 is a tube-like shaped cooling apparatus (having a double structure) comprising a compressed gas supply port 705 through which a compressed gas 704 is supplied, a hot gas exhaust port 708 including a pressure regulator 706, a cooling gas outlet 702, and a vortex generator zone 703 to generate a vortex flow 709. Reference numeral 701 indicates a direction for a cooling gas to be spouted, and reference numeral 707 a hot gas to be exhausted.

In the cooling apparatus shown in FIG. 6, a compressed gas 704 is introduced into the inside of the apparatus through the gas supply port 705. The compressed gas 704 thus supplied expands in vortex generator zone 703. The gas is thereby cooled, and the cooled gas is then exhausted through the cooling gas outlet 702. By virtue of heat transfer, a hot gas 707 is exhausted through exhaust port 708. In the case where a gas having a temperature of about 16° C. is supplied at a gas pressure of 3 to 7 kg/cm$^2$ through the gas supply port 705, there is obtained a cold gas having a temperature of about −10 to about −50° C. The compressed gas used in this apparatus may comprise an incombustible gas comprising one or more gases selected from the group consisting of $N_2$ gas, Ar gas, He gas, $CO_2$ gas, and fluorocarbon gas.

By this, particularly in the case where the cooling step and the opening step for the sealed type battery are conducted in continuous atmosphere (which will be described later), even when internal shorts should occur between the anode and cathode upon opening the battery housing by way of a cutting manner, the generation of a spark can be desirably prevented. Further, in the case of an enclosed type battery having a battery housing capable of being opened by way of disassembling without conducting cutting operation or the like, the generation of a spark due to internal shorts between the anode and cathode can be desirably prevented at the time when the components including the electrodes are taken out. Because of this, the recovery operation of the battery components can be safely conducted.

In the case where the cooling step is conducted using a liquefied gas, there can be employed a cooling manner wherein the entirety of a sealed type battery to be opened is directly immersed in an appropriate liquefied gas such as liquid nitrogen, liquid helium or the like or a cooling manner wherein a gasified low temperature gas of a liquefied gas is sprayed onto the battery housing of the sealed type battery to be unsealed.

In the case where the cooling step is conducted using a cooling agent, the cooling agent can include dry ice-methanol, dry ice-ethanol, and ice.

As previously described, it is possible that a sealed type battery is immersed in water, the water is frozen together with the battery, and the battery housing is opened in a state in which the battery is sealed in the ice.

Battery Opening

Description will be made of particulars in the opening step for opening the housing of a sealed type battery in which the ionic conductivity of the electrolyte has been decreased by means of the apparatus shown in FIG. 3 or 4 and in the opening step in the apparatus shown in FIG. 5.

The atmosphere in which opening of the housing of a sealed type battery is conducted is desirably comprised of an incombustible gas comprising one or more gases selected from the group consisting of $N_2$ gas, Ar gas, He gas, $CO_2$ gas, steam, and fluorocarbon gas. In this case, even when internal shorts should occur between the anode and cathode upon opening the battery housing, the generation of a spark is desirably prevented and in addition, the battery components are desirably prevented from being damaged due to oxidation.

In the case where the cooling step is conducted by spraying a low temperature gas to the sealed type battery as previously described, by using a gas of the same kind as the low temperature gas as the constituent of the atmosphere in which the unsealing step is conducted, there are provided advantages such that the operation including recovery and recycling of the gas can be readily conducted and the running cost is reasonable.

Specific examples of the above fluorocarbon gas are tetrafluoromethane, hexafluoroethane, perfluoropropane, trifluoromethane, monobromotrifluoromethane, dichlorodifluoromethane, and chlorotrifluoromethane.

Battery Unsealing Means

As previously described, opening the battery housing of a sealed type may be accomplished through an appropriate unsealing manner by way of cutting with the use of a high pressure water or an energy beam (for instance, the unsealing manner using the unsealing apparatus 204 shown in FIG. 5) or a mechanically cutting manner.

The cutting with the use of a high pressure water may be conducted, for example, by a manner of spraying an extra-high pressure water of preferably 1000 kg/cm$^2$ or more or more preferably, 3000 kg/cm$^2$ or more onto the battery housing of an enclosed type battery in a jet-like stream through a nozzle. In this case, the extra-high pressure water to be sprayed may contain an appropriate abrasive depending upon the kind of the constituent of the battery housing.

The above energy beam can include laser beam, electron beam and the like.

The above mechanically cutting manner may be conducted by using a cutting apparatus of cutting an object by rotating a disc-like shaped blade (having a hard and sharp edge) at a high speed or by way of shearing.

Incidentally, in the case where the sealed type battery is cooled such that the battery is sealed in the ice as previously described, to open the housing of the battery is desired to be conducted while maintaining said sealed state.

For the sealed type battery in which the ionic conductivity of the electrolyte has been decreased and whose housing has been opened as previously described, the inside of the resultant battery is subjected to washing or the like, followed by subjecting to classification and separation, and at a final stage, the constituent components thereof are recovered.

Decrease of Reactivity of Active Lithium and Recovery of Lithium Element

In the case where the sealed type battery to be subjected to recovery is a sealed type lithium battery, after the battery housing has been opened, by decreasing the reactivity of an active lithium contained in the lithium battery, the successive step for recovering the battery components can be safely conducted. Decreasing the reactivity of the active lithium having a high reactivity may be conducted by a manner of reacting an appropriate reacting agent with the active lithium. From the reaction product comprising the reacting agent and lithium obtained in this case, the recovery of lithium element can be easily conducted.

Specific examples of the reacting agent are water, alcohols, acids, carbon dioxide, and mixtures of two or more of these.

Recovery of Electrolyte Solution

In the case where the electrolyte solution of a sealed type battery is extracted by increasing the internal pressure of the enclosed type battery, for instance, in the manner previously described with reference to FIGS. 3 and 4, followed by opening the battery housing, the recovery of the electrolyte solution can be easily conducted.

Now, to recover the electrolyte solution in the case where a sealed type battery is cooled and the battery housing is opened may be conducted, for example, in the following manner.

In the case of a sealed type battery in which an aqueous electrolyte solution is used, after the battery housing is opened, the resultant unsealed battery is subjected to washing with deionized water, the resultant washed solution is filtrated, followed by vaporizing water, whereby the electrolyte can be recovered.

In the case of a sealed type battery in which an electrolyte solution comprising an electrolyte dissolved in an organic solvent is used, after the battery housing is unsealed, the resultant unsealed battery is subjected to washing with an appropriate organic solvent, followed by subjecting to fractional distillation, whereby the electrolyte solution can be recovered. As the organic solvent in this case, when an organic solvent incapable of forming an azeotrope with water is used, there are provided advantages such that a cutting manner using a high pressure water can be employed in cutting the battery housing, and as the reacting agent in order to decrease the reactivity of the active lithium, readily obtainable water with a reasonable production cost can be used.

Description will be made of the above organic solvent incapable of forming an azeotrope with water.

As above described, in the case of an enclosed type lithium battery, by using an organic solvent incapable of forming an azeotrope with water in washing an unsealed lithium battery obtained as a result of having unsealed the sealed type lithium battery, even when inexpensive deionized water is used as the reacting agent to decrease the reactivity of the active lithium contained in the lithium battery, the washing organic solvent can be readily separated from the water by way of fractional distillation.

Specific examples of the foregoing organic solvent incapable of forming an azeotrope with water are methanol, acetone, 1,2-propanediol, dimethyl sulfoxide, butyrolactone, ethylene carbonate, and propylene carbonate.

In the following, description will be made of an enclosed type battery whose constituent components are recovered according to the present invention, while referring to the drawings.

Figure 7:
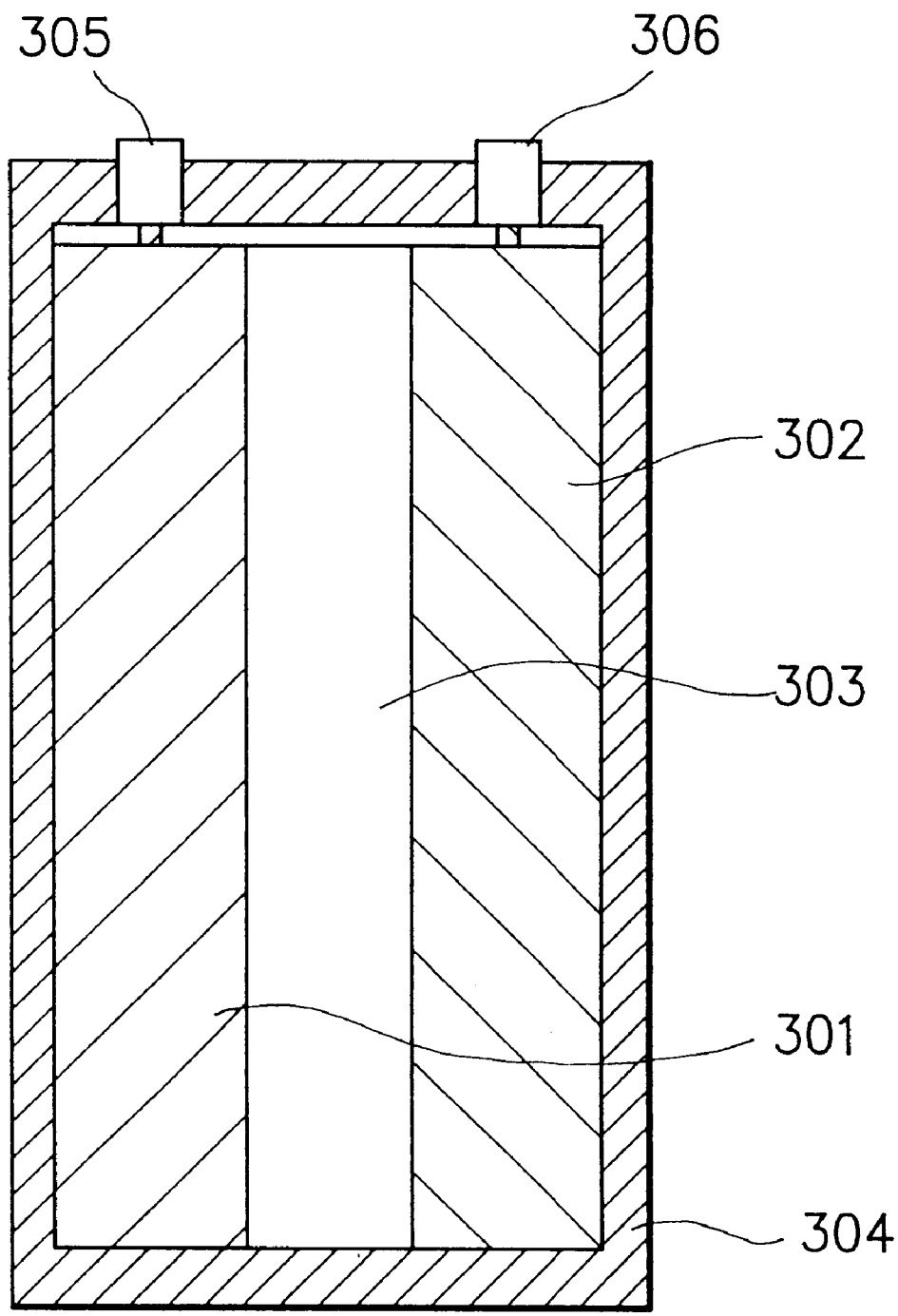
FIG. 7 is a schematic cross-sectional view illustrating an example of a sealed type battery whose components are recovered in the present invention.

FIG. 7 is a schematic cross-sectional view illustrating an example of a sealed type battery whose constituent components are recovered according to the recovering process or apparatus according to the present invention.

The sealed type battery shown in FIG. 7 comprises an anode 301, a cathode 302 and a separator 303 including an electrolyte which are enclosed by a battery housing 304. In the case where a solid electrolyte is used as the electrolyte, no separator is occasionally installed. Reference numeral 305 indicates a negative terminal, and reference numeral 306 indicates a positive terminal.

For the configuration of the enclosed type battery (particularly, the sealed type rechargeable battery) whose constituent components are recovered according to the recovering process or apparatus according to the present invention, it may be in the form of a flat round shape (or a coin-like shape), a cylindrical shape, a prismatic shape, or a sheet-like shape. For the battery structure, it includes a single-layered type, a multi-layered type and a spiral-wound type. In the case of a spiral-wound cylindrical battery comprising a stacked body (comprising a separator interposed between an anode and a cathode) wound in multiple about a predetermined axis, it has advantages in that the battery area can be increased as desired and a high electric current can flow upon operating charging and discharging. In the case of a battery in either a prismatic form or sheet-like form, it has an advantage in that the space of an instrument for housing the battery can be effectively utilized.

In the following, description will be made of the shape and structure of such a battery with reference to FIGS. 8, 9 and 10.

Figure 8:
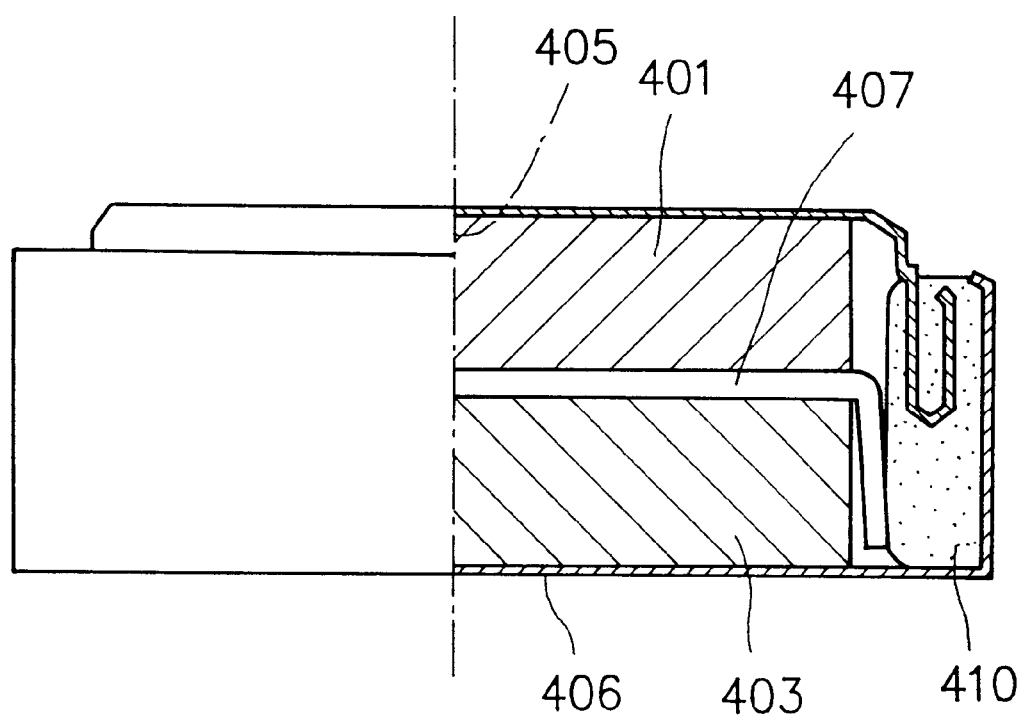
FIG. 8 is a schematic cross-sectional view illustrating an example of a coin-like shaped battery.

FIG. 8 is a schematic cross-sectional view illustrating an example of a single-layer structure type flat battery. FIG. 9 is a schematic cross-sectional view illustrating an example of a spiral-wound cylindrical battery. FIG. 10 is a schematic perspective view illustrating an example of a prismatic battery. These batteries basically have a constitution similar to that shown in FIG. 6 and they comprise an anode, a cathode, a separator including an electrolyte, a battery housing and a pair of terminals.

Figure 9:
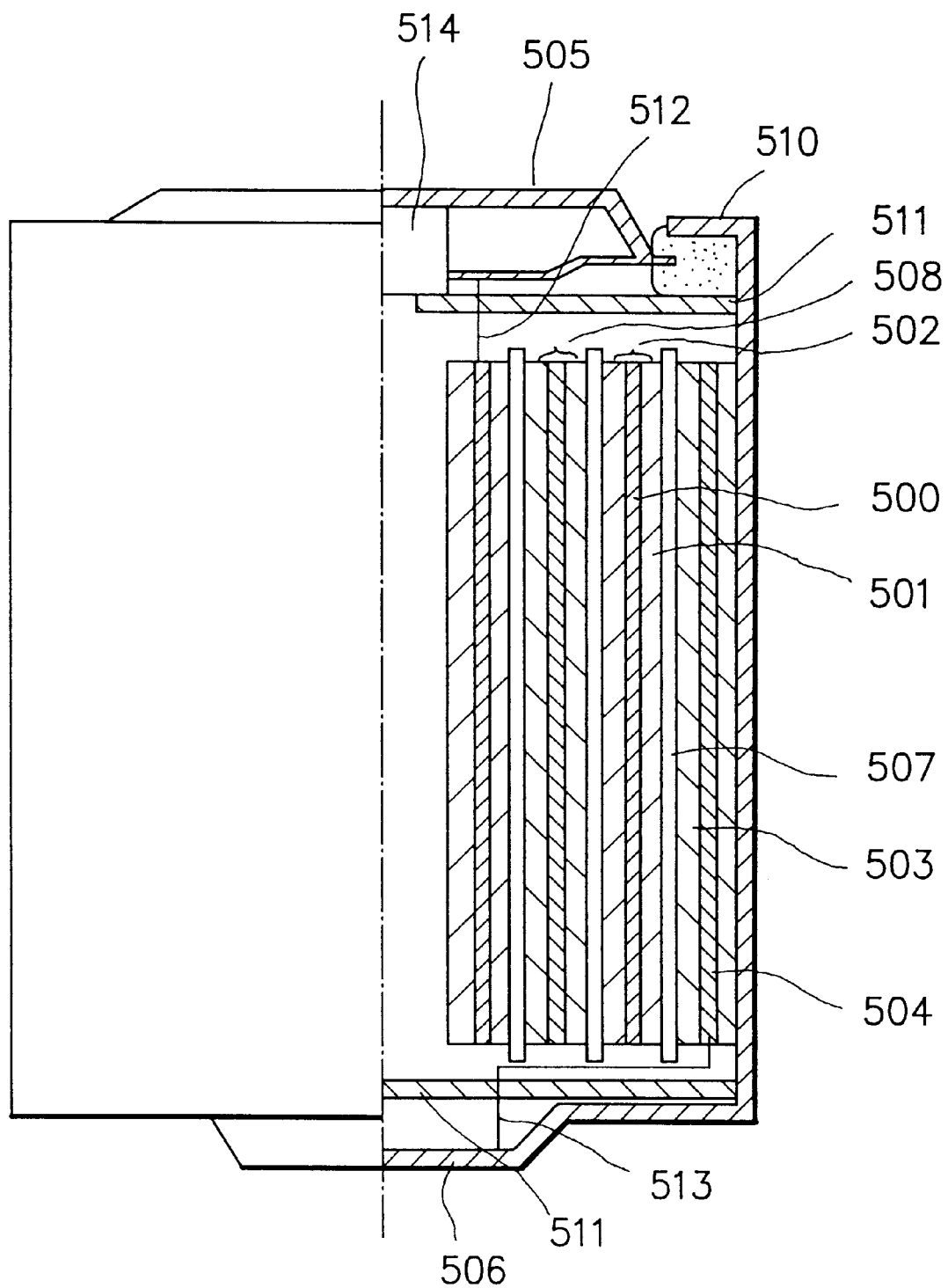
FIG. 9 is a schematic cross-sectional view illustrating an example of a spiral-wound cylindrical battery.

In FIGS. 8 and 9, reference numerals 401 (in FIG. 8) indicates an anode comprising an anode active material layer, reference numeral 501 (in FIG. 9) an anode active material layer, reference 502 (in FIG. 9) an anode, each of reference numerals 403 (in FIG. 8) and 508 (in FIG. 9) a cathode comprising a cathode active material layer, reference numeral 503 (in FIG. 9) a cathode active material layer, each of reference numerals 405 and 505 an anode cap (or an anode terminal), each of reference numerals 406 and 506 a cathode can (or a cathode terminal), each of reference numerals 407 and 507 a separator with an electrolyte (or an electrolyte solution) retained therein, and each of reference numerals 410 and 510 a gasket (or an insulating packing).

In FIG. 9, reference numeral 500 indicates an anode collector, reference numeral 504 indicates a cathode collector, reference numeral 511 an insulating plate, and reference numeral 514 a safety vent.

Particularly, in the single-layer structure type flat battery shown in FIG. 8, a stacked body comprising the cathode 403 comprising the cathode active material and the the anode 401 comprising the anode active material layer stacked through at least the separator 407 having an electrolyte solution retained therein is housed in the cathode can 406 on the cathode side. The anode side of the stacked body in the cathode can 406 is sealed by the anode cap 405 as the anode terminal and the residual inside space of the cathode can 406 is packed by the gasket 410 (comprising an insulating material).

In the spiral-wound cylindrical battery shown in FIG. 9, a stacked body wound in multiple about a predetermined axis is housed in the cathode can 506 as the cathode terminal such that the side face and a given bottom face side of the stacked body are covered by the cathode can 506, said stacked body comprising at least the separator 507 having an electrolyte solution retained therein interposed between the cathode 508 containing the cathode active material layer 503 formed on the cathode collector 504 and the anode 502 containing the anode active material layer 501 formed on the anode collector 500. In the uncovered side of the cathode can 506, the anode cap as the anode terminal is installed. The residual inside space of the cathode can 506 is packed by the gasket 510 (comprising an insulating material). The stacked electrode body having the cylindrical structure is electrically isolated from the anode cap side through the insulating plate 511. The anode 502 is electrically connected to the anode cap 505 by means of the anode lead 512. Similarly, the cathode 508 is electrically connected to the cathode can 506 by means of the cathode lead 513. On the anode cap side, there is provided the safety vent 514 for adjusting the internal pressure of the battery. This safety vent can be utilized for extracting the electrolyte solution to the outside as previously described.

Figure 10:
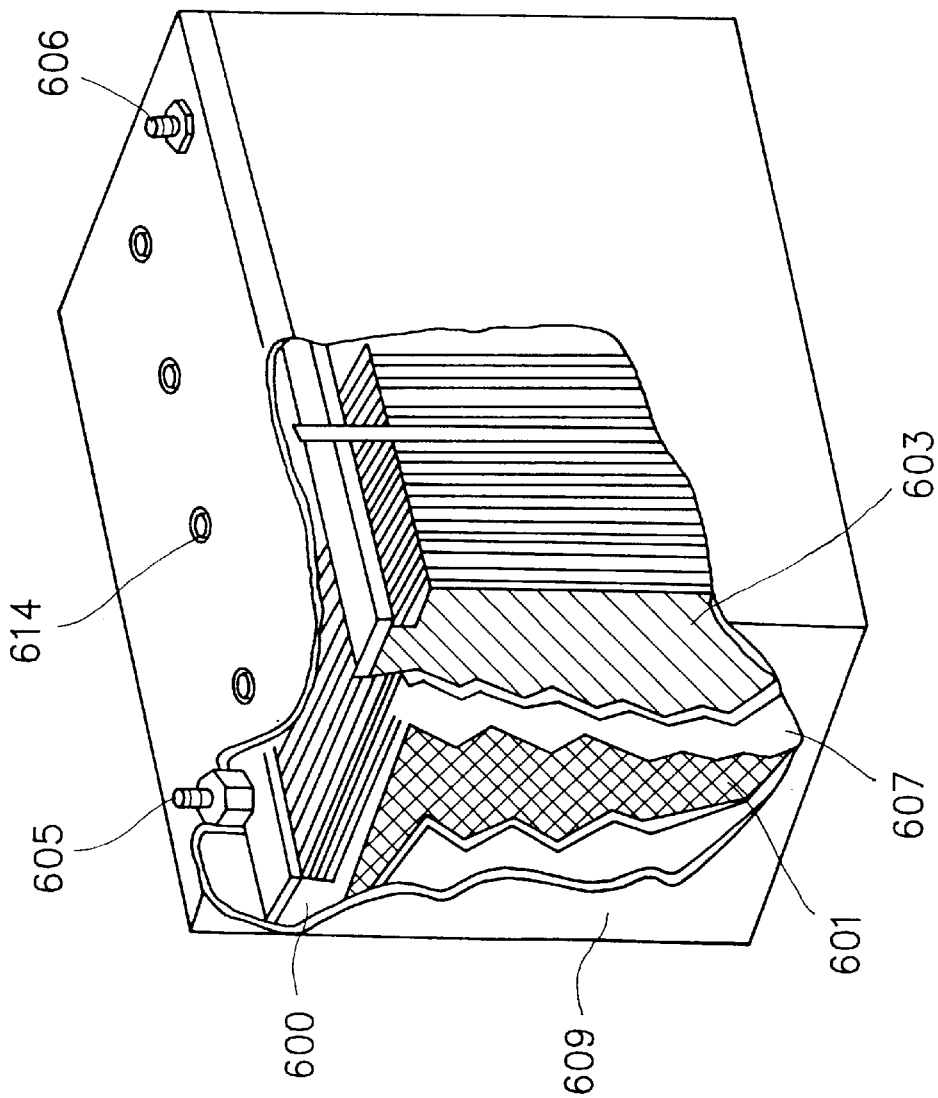
FIG. 10 is a schematic perspective view illustrating an example of a prismatic battery.

The prismatic battery shown in FIG. 10 comprises a plurality of unit cells integrated in parallel connection through an anode collector 600 in a battery housing 609 having a capping, wherein each unit cell comprises a separator 607 having an electrolyte solution retained therein interposed between an anode 601 comprising an anode active material and a cathode 603 comprising a cathode active material. The anode 601 is electrically connected to an anode terminal 605 electrically connected to the anode collector 600, and the cathode 603 is electrically connected to a cathode terminal 606. The prismatic battery is provided with a plurality of safety vents 614 at the capping of the battery housing 609.

In the following, description will be made of each battery constituent.

As the constituent of the gasket (410, 510), there can be used, for example, fluororesin, polyamide resin, polysulfone resin, or various rubbers. The battery sealing is typically conducted by way of caulking with the use of the gasket in the case of the structure as shown in FIG. 8 or 9. Besides this, it may be conducted by means of glass sealing, adhesive sealing, welding or soldering.

As the constituent of the insulating plate 511 shown in FIG. 9, there can be used organic resins and ceramics.

Now, for the enclosed type battery whose constituent components are recovered in the present invention, in the case of such configuration as shown in FIG. 8 or 9, the electrode terminals, cathode can and anode can serve respectively as a battery housing corresponding to the battery housing of said enclosed type battery in which respective battery components are housed. Particularly, in the case of the configuration shown in FIG. 8, the cathode can 406 and the anode cap 405 serve respectively as a battery housing which functions also as an outputting terminal. In the case of the configuration shown in FIG. 9, the cathode can 506 and the anode cap 505 serve respectively as a battery housing which functions also as a terminal. The constituent of such battery housing functioning also as the terminal may be stainless steel, titanium clad stainless steel, copper clad stainless steel, or nickel-plated steel.

In the configurations shown in FIGS. 8 and 9, since the cathode can (406, 506) and the anode cap (405, 505) function respectively also as a battery housing, they are desired to be constituted by stainless steel.

As in the case of such configuration as shown in FIG. 10, when neither the cathode can nor the anode can functions also as a battery housing, the constituent of the battery housing can include metals such as zinc, plastics such as polypropylene, and composites of a metal or glass fiber with plastic.

For the enclosed type battery whose constituent components are recovered in the present invention, it is desirable to provide an appropriate safety vent as in the case of the configuration shown in FIG. 9 (wherein the safety vent 514 is provided) or FIG. 10 (wherein the safety vents 614 are provided) in order to ensure the safety when the internal pressure of the battery is incidentally increased, by communicating the inside of the battery with the outside to thereby reduce the increased internal pressure of the battery. The safety vent may be constituted of a material comprising a rubber, a spring, a metal boll or a rupture foil. The safety vent can be utilized for extracting the electrolyte solution present in the battery as previously described.

In the following, description will be made of each of the anode, cathode, separator and electrolyte of the enclosed type battery used in the present invention.

ANODE

The enclosed type battery in which an aqueous electrolyte solution is used and whose constituent components are recovered in the present invention includes lead-acid battery, nickel-cadmium battery, nickel-metal hydride battery, and nickel-zinc battery.

The anode in these-batteries comprises an anode active material comprising lead, cadmium, hydrogen-absorbing alloy or zinc, and an anode collector.

The enclosed type battery whose constituent components are recovered in the present invention also includes various lithium batteries. The anode in these lithium batteries comprises a principal constituent which retains lithium therein at a stage before operating discharging, and an anode collector.

Specific examples of such principal constituent are lithium metals, carbonous materials in which lithium is intercalated, transition metal oxides, and lithium alloys.

The anode collector serves to supply an electric current so that it can be efficiently consumed for the electrode reaction upon operating charging and discharging or to collect an electric current generated.

The anode collector may be constituted by an appropriate material which is highly electrically conductive and inactive to the battery reaction.

Specific examples of such material are metals such as Ni, Ti, Cu, Al, Pt, Pd, Au, and Zn, alloys of these metals such as stainless steel, and composite metals of two or more said metals.

The anode collector may be shaped in a plate-like form, foil-like form, mesh form, porous form-like sponge, punching metal form, or expanded metal form.

CATHODE

The cathode in the enclosed type battery whose constituent components are recovered in the present invention generally comprises a cathode collector, a cathode active material, an electrically conductive auxiliary, and a binding agent.

The cathode is usually formed by disposing a mixture of a cathode active material, an electrically conductive auxiliary and a binding agent on a member capable of serving as a cathode collector.

The electrically conductive auxiliary can include graphite, carbon blacks such as ketjen black and acetylene black, and metal fine powders of nickel or the like.

As the binding agent in the case of using a nonaqueous series electrolyte solution, there can be illustrated polyolefins such as polyethylene, polypropylene, and the like; and fluororesins such as polyvinylidene fluoride, tetrafluoroethylene polymer, and the like.

As the binding agent in the case of using an aqueous series electrolyte solution, there can be illustrated celluloses, polyvinyl alcohol, and polyvinyl chloride, in addition those illustrate in the case of using the nonaqueous series electrolyte solution.

As the cathode active material in the enclosed type battery in which an aqueous series electrolyte solution is used and whose constituent components are recovered in the present invention such as lead-acid battery, nickel-cadmium battery, nickel-metal hydride battery, or nickel-zinc battery, there is used lead oxide, nickel (III) oxyhydroxide or nickel hydroxide.

The enclosed type battery whose constituent components are recovered in the present invention includes also various lithium batteries. As the cathode active material in these lithium batteries, there is usually used a compound selected from transition metal oxides, transition metal sulfides, lithium-transition metal oxides, and lithium-transition metal sulfides. The metals of these transition metal oxides and transition metal sulfides can include metals partially having a d-shell or f-shell. Specific examples of such metals are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are particularly appropriate.

The cathode collector in the enclosed type battery whose constituent components are recovered in the present invention serves to supply an electric current so that it can be efficiently consumed for the electrode reaction upon conducting the charging and discharging or to collect an electric current generated. The cathode collector is therefore desired to be constituted by a material which has a high electrical conductivity and is inactive to the battery reaction.

The material by which the cathode collector is constituted can include Ni, Ti, Cu, Al, Pt, Pb, Au, Zn, alloys of these metals such as stainless steel, and LIT, composite metals of two or more of said metals.

The cathode collector may be shaped in a plate-like form, foil-like form, mesh form, porous form-like sponge, punching metal form, or expanded metal form.

Herein, the term "active material" in the foregoing anode or cathode active material means a material which is involved in the repetition of electrochemical reversible reaction of charging and discharging in the battery. Said active material can include, in addition to said material which is involved in the above reaction by itself, other material capable of being involved in the above reaction.

SEPARATOR

The separator in the enclosed type battery whose constituent components are recovered in the present invention is disposed between the anode and the cathode, and it serves to prevent the anode and the cathode from suffering from internal-shorts. In addition, the separator also serves to retain the electrolyte solution.

The separator is required to have a porous structure capable of allowing ions involved in the charge and discharge reaction in the battery to pass therethrough, and it is also required to be insoluble in and stable to the electrolyte solution.

The separator is usually constituted by a nonwoven fabric or a memberane having a micropore structure made of glass, polyolefin such as polypropylene or polyethylene, fluororesin, or polyamide. Alternatively, the separator may be constituted by a metal oxide film or a resin film combined with a metal oxide respectively having a number of micropores.

ELECTROLYTE

For the electrolyte used in the enclosed type battery whose constituent components are recovered in the present invention, there can be used an appropriate electrolyte as it is, a solution of said electrolyte dissolved in a solvent, or a material of said solution having been immobilized using a gelling agent.

However, An electrolyte solution obtained by dissolving an appropriate electrolyte in a solvent is usually used in a way that said electrolyte solution is retained on the separator.

The higher the electrical conductivity of the electrolyte, the better. Particularly, it is desired to use such an electrolyte that the electrical conductivity at 25° C. is preferably $1\times10^{-3}$ S/cm or more or more preferably, $5\times10^{-3}$ S/cm or more.

In the case of a lead-acid battery, there is used an aqueous solution of sulfuric acid as the electrolyte.

As the electrolyte in the case of a nickel-cadmium battery, nickel-metal hydride battery, or nickel-zinc battery, there is used an aqueous solution of an alkali. Particularly, there is usually used an aqueous solution of potassium hydroxide added with lithium hydroxide.

As the electrolyte in the case of a lithium battery, there is usually used a given electrolyte dissolved in a given solvent.

The electrolyte can include inorganic acids such as $H_2SO_4$, HCl and $HNO_3$; salts of Li+ (lithium ion) with Lewis acid ions such as $BF_4^-$, $PF_6^-$, $ClO_4^-$, $CF_3SO_3^-$, or $BPh_4^-$ (with Ph being a phenyl group); and mixtures of two or more of said salts.

Besides these, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sulfoxide, methyl formate, 3-methyl-2-oxdazolydinone, 2-methyltetrahydrofuran, 3-propylsydonone, sulfur dioxide, phosphonyl chloride, thionyl chloride, sulfur chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte solution, it is desired for the electrolyte solution to be gelated using an appropriate gelating agent.

The gelating agent usable in this case can include polymers having a property such that it absorbs the solvent of the electrolyte solution to swell. Specific examples of such polymer are polyethylene oxide, polyvinyl alcohol, and polyacrylamide.

In the following, the present invention will be described in more detail with reference to examples, which are only for illustrative purposes but not intended to restrict the scope of the present invention to these examples.

EXAMPLE 1

In this example, for a prismatic nickel-metal hydride battery having the configuration shown in FIG. 10, based on the flow diagram shown in FIG. 1 and using the apparatus shown in FIG. 3 as a part of the previously described recovery system, the battery housing thereof was unsealed, followed by subjecting to washing, the resultant was dissociated into individual battery components, and these battery components were separately recovered.

As the above battery, there was used a used prismatic nickel-metal hydride battery which comprises a cathode comprising a porous nickel material whose porous structure is filled by nickel hydroxide and nickel fine particles, an anode comprising a porous nickel material whose porous structure is filled by a powdery hydrogen storage alloy and a binder, an electrolyte solution comprising an aqueous solution of potassium hydroxide with lithium hydroxide, and a battery housing made of polypropylene.

In the following, the step of decreasing the ionic conductivity in the battery, the unsealing step, and the recovering step will be sequentially explained with reference to FIGS. 1 and 3.

1. A capacitor was electrically connected to the terminal of the prismatic nickel-metal hydride battery, followed by subjecting the battery to discharging, whereby the residual electric capacity in the battery was transferred into the capacitor.

2. The battery thus discharged was set to the apparatus shown in FIG. 3 such that the safety vent-bearing face thereof was downwardly faced as shown in FIG. 3.

3. By actuating the vacuum pump of the vacuuming means 105 and opening the exhaust valve 109, the inside of the storage tank 104 was depressurized, followed by closing the exhaust valve 109. Then, the switching valve 108 was opened to actuate the safety vents of the battery. By this, the internal pressure of the battery was increased and as a result, the electrolyte solution in the battery was extracted into the extraction pipe 103, followed by flowing into the storage tank 104. The reafter, the leak valve 113 was opened to introduce nitrogen gas into the apparatus, whereby the inside of the storage tank 104 was returned to atmospheric pressure. Then, the battery whose electrolyte solution having been extracted was detached from the apparatus.

The electrolyte solution of the battery was recovered in the storage tank 104. The electrolyte solution thus recovered can be recycled by filtrating and refining it.

4. The battery whose electrolyte solution having been extracted obtained in step 3 was set to a high pressure water cutting apparatus, wherein a high pressure water (containing a powdery abrasive) of 3500 kg/cm$^2$ was sprayed onto the battery to cut and unseal the battery housing of the battery.

5. From the unsealed battery obtained in step 4, the cathode, anode and separator were taken out, washed, and dried, then followed by classification and recovery.

In this case, because the electrolyte solution had been extracted from the battery in step 3, even when the anode should have been contacted with the cathode upon taking out them, they could be safely recovered with no energy release.

In the above, for the used prismatic nickel-metal hydride battery before the extraction of the electrolyte solution was conducted, the impedance between the positive and negative terminals was measured by means of an impedance meter. As a result, it was found to be 2 mΩ. The impedance between the terminals was measured in the same manner after extraction of the electrolyte solution. As a result, it was found to be more than 5 MΩ. This indicates that by the above cooling, the internal resistance of the battery seemingly has been desirably increased.

In this example, description has been made of the recovery of the prismatic nickel-metal hydride battery.

But the recovering manner of this example is not restrictive. The recovering manner is effective in recovering other enclosed type batteries in which a liquid electrolyte is used and having a safety vent such as nickel-cadmium battery, lead battery and lithium batteries including lithium ion battery.

EXAMPLE 2

In this example, for a cylindrical lithium battery having the configuration shown in FIG. 9, based on the flow diagram shown in FIG. 2 and using the cooling and unsealing apparatus shown in FIG. 5, the battery housing thereof was unsealed, followed by subjecting to washing, the resultant was dissociated into individual battery components, and these battery components were separately recovered.

As the above battery, there was used a spent primary lithium battery in which an anode formed by press-laminating a lithium metal foil on an expanded metal of nickel, a cathode formed by applying a paste (obtained by mixing manganese dioxide (as a cathode active material), acetylene black (as an electrically conductive auxiliary) and polyvinylidene fluoride (as a binder)) on a nickel mesh member and drying the resultant, a separator comprising a polyethylene member having a number of pores, and an electrolyte solution obtained by dissolving lithium tetrafluoroborate in an amount of 1 M (mol/l) in a mixed solvent composed of ethylene carbonate (EC) and dimethyl carbonate (DMC) are sealed by way of caulking. And there was used a stainless steel as the battery housing.

In the following, the step of discharging and recovering the residual electric capacity in the battery prior to cooling the battery in the flow diagram in FIG. 2, the step of cooling the battery, the unsealing step, and the recovering step will be sequentially explained with reference to FIGS. 2 and 5.

1. A capacitor was electrically connected to the outputting terminal of the used cylindrical primary lithium battery, followed by subjecting the battery to discharging, whereby the residual electric capacity in the battery was transferred into the capacitor.

2. Using the cooling apparatus 201 in FIG. 5, the battery discharged in step 1 was immersed in liquid nitrogen, followed by cooling the battery to a temperature lower than the coagulation point of the mixed organic solvent (composed of ethylene carbonate and dimethyl carbonate) of the electrolyte solution, whereby the ionic conductivity in the battery was decreased.

The impedances between the positive and negative terminals before and after the cooling treatment were measured by using the impedance meter as in Example 1. The measured results revealed that the impedance before the cooling treatment is 60 mΩ and that after the cooling treatment is more than 50 KΩ.

Only the electrolyte solution was cooled under the same condition as that for cooling the battery. The ionic conductivities of the electrolyte before and after the cooling treatment were measured. As a result, the ionic conductivity before the cooling treatment was found to seemingly have been decreased to 1/10 by the cooling treatment, 3. The battery cooled in step 2 was taken out in an Ar gas atmosphere, it was mounted on the fixing table (207, in FIG. 5), followed by transporting by means of the transportation mechanism (208, in FIG. 5) to the unsealing zone containing the unsealing apparatus (204, in FIG. 5) comprising a high pressure water cutting apparatus, wherein an extra-high pressure water of 3500 kg/cm$^2$ containing a powdery abrasive was sprayed onto the battery through the nozzle to cut and unseal the battery housing of the battery.

4. The battery thus unsealed was subjected to washing with methanol, where the active lithium present in the battery was converted into lithium alcoholate. Thereafter, the resultant mixed solvent composed of the electrolyte solution and the methanol was recovered. From the cylindrical can as the battery housing, the anode, separator and cathode were taken out and they were separately recovered.

EXAMPLE 3

In this example, for a coin-like shaped rechargeable lithium battery having the configuration shown in FIG. 8, based on the flow diagram shown in FIG. 2 and using the cooling and unsealing apparatus shown in FIG. 5, the battery housing thereof was unsealed, and subjected to washing, the resultant was dissociated into individual battery components, and these battery components were separately recovered.

As the above battery, there was used a spent coin-like shaped rechargeable lithium battery in which an anode formed by press-laminating a lithium metal foil on an expanded metal of nickel, a cathode formed by applying a paste (obtained by mixing a lithium-nickel oxide material (as a cathode active material), acetylene black (as an electrically conductive auxiliary) and polyvinylidene fluoride (as a binder) to obtain a mixture and adding N-methylpyrrolidone to said mixture) on a nickel mesh member and drying the resultant, and a polymer solid electrolyte obtained by dissolving lithium tetrafluoroborate in an amount of 1 M (mol/l) in a mixed solvent composed of diethyl carbonate and propylene carbonate with an equivalent mixing ratio and solidifying the resultant by adding polyethylene oxide thereto are sealed by way of caulking. And there was used a stainless. steel as the battery housing of the lithium battery.

In the following, the step of discharging and recovering the residual electric capacity in the battery prior to cooling the battery in the flow diagram in FIG. 2, the step of cooling the battery, the unsealing step, and the recovering step will be sequentially explained with reference to FIGS. 2 and 5.

As the cooling means (the cooling apparatus 201 in FIG. 5), there was used a cooling apparatus (trademark name:

VORTEX TUBE, produced by VORTEX Company of the United States) in which a compressed gas is provided. As the compressed gas, there was used $CO_2$ gas.

1. $CO_2$ gas of 5 kg/cm$^2$ was fed through the gas supply port of the foregoing cooling apparatus 201 to spray a $CO_2$ cold blast of −40° C. onto the used coin-like shaped rechargeable lithium battery, whereby the battery was cooled to a temperature lower than the glass transition point of the polyethylene oxide of the polymer solid electrolyte.

The impedances between the positive and negative terminals of the used battery before and after the cooling treatment were measured in the same manner as in Example 1. The measured results revealed that the impedance before the cooling treatment is 500 mΩ and that after the cooling treatment is more than 5 MΩ. Based on this and the result of the measurement of the ionic conductivities of the electrolyte solution in the same manner as in Example 2, the ionic conductivity before the cooling treatment was found to seemingly have been decreased to $1/10$ as a result of the cooling treatment.

2. The battery cooled in step 2 was taken out in a $CO_2$ gas atmosphere, it was mounted on the fixing table (207, in FIG. 5), followed by transporting by means of the transportation mechanism (208, in FIG. 5) to the unsealing zone containing the unsealing apparatus (204, in FIG. 5) comprising a YAG laser cutting apparatus, wherein a laser beam was irradiated onto the battery to cut and unseal the battery housing of the battery.

3. From the cut rechargeable battery can as the battery housing, the anode, polymer solid electrolyte and cathode were taken out and they were separately recovered.

EXAMPLE 4

In this example, for a cylindrical rechargeable lithium battery having the configuration shown in FIG. 9, based on the flow diagram shown in FIG. 2 and using the cooling and unsealing apparatus shown in FIG. 5, the battery housing thereof was unsealed and subjecting to washing, the resultant was dissociated into individual battery components, and these battery components were separately recovered.

As the above battery, there was used a used cylindrical rechargeable lithium battery in which an anode formed by applying a paste (obtained by mixing a natural graphite with polyvinylidene fluoride (as a binder) to obtain a mixture and adding N-methylpyrrolidone to said mixture) on a copper foil and drying the resultant, a cathode formed by applying a paste (obtained by mixing a lithium-cobalt oxide material (as a cathode active material), acetylene black (.as an electrically conductive auxiliary) and polyvinylidene fluoride (as a binder) to obtain a mixture and adding N-methylpyrrolidone to said mixture) on an aluminum foil and drying the resultant, a separator comprising a polyethylene member having a number of pores, and an electrolyte solution obtained by dissolving lithium tetrafluoroborate in an amount of 1 M (mol/1) in a mixed solvent composed of ethylene carbonate (EC) and dimethyl carbonate (DMC) with an equivalent mixing ratio are sealed by way of caulking. There was used a stainless steel as the battery housing.

In the following, the step of discharging and recovering the residual electric capacity in the battery prior to cooling the battery in the flow diagram in FIG. 2, the step of cooling the battery, the unsealing step, and the recovering step will be sequentially explained with reference to FIGS. 2 and 5.

As the cooling means (the cooling apparatus 201 in FIG. 5), there was used a cooling apparatus (trademark name: VORTEX TUBE, produced by VORTEX Company of the United States) in which a compressed gas is provided. As the compressed gas, there was used Ar gas.

1. A capacitor was electrically connected to the outputting terminal of the cylindrical rechargeable lithium battery, followed by subjecting the battery to discharging, whereby the residual electric capacity in the battery was transferred into the capacitor.

2. Ar gas of 7 $kg/cm^2$ was fed through the gas supply port of the foregoing cooling apparatus 201 to spray an Ar cold blast of $-30°$ C. onto the spent cylindrical rechargeable lithium battery discharged in step 1, whereby the battery was cooled to a temperature lower than the coagulation point of the mixed solvent (composed of the ethylene carbonate and dimethyl carbonate) of the electrolyte solution.

The impedances between the positive and negative terminals before and after the cooling treatment were measured in the same manner as in Example 1. The measured results revealed that the impedance before the cooling treatment is 80 m$\Omega$ and that after the cooling treatment is more than 5 k$\Omega$. Based on this and the result of the measurement of the ionic conductivity of the electrolyte solution in the same manner as in Example 2, the ionic conductivity before the cooling treatment was found to seemingly have been decreased to $1/10$ as a result of the cooling treatment.

3. The battery cooled in step 2 was taken out in an Ar gas atmosphere, it was mounted on the fixing table (207, in FIG. 5), followed by transporting by means of the transportation mechanism (208, in FIG. 5) to the unsealing zone containing the unsealing apparatus (204, in FIG. 5) comprising an extra-high pressure cutting apparatus, wherein an extra-high pressure water (containing a powdery abrasive) of 3500 $kg/cm^2$ was sprayed onto the battery to cut and unseal the battery housing of the battery.

4. The battery thus unsealed was subjected to washing with water, where the active lithium present in the battery was converted into lithium hydroxide. Thereafter, it was further washed, where the resultant mixed solvent composed of the electrolyte solution, methanol and water was recovered. From the cylindrical can as the battery housing, the anode, separator and cathode were taken out and they were separately recovered. The above mixed solvent composed At, of the electrolyte solution, methanol and water was subjected to distillation, where the electrolyte, organic solvent and methanol were separately recovered.

EXAMPLE 5

In this example, using a used cylindrical rechargeable lithium battery having the same constitution as that of the cylindrical rechargeable lithium battery used in Example 4 and based on the flow diagram shown in FIG. 2, the battery housing thereof was unsealed and subjected to washing, the resultant was dissociated into individual battery components, and these battery components were separately recovered.

In the following, the step of discharging and recovering the residual electric capacity in the battery prior to cooling the battery in the flow diagram in FIG. 2, the step of cooling the battery, the unsealing step, and the recovering step will be sequentially explained with reference to FIG. 2.

1. A capacitor was electrically connected to the outputting terminal of the cylindrical rechargeable lithium battery, followed by subjecting the battery to discharging, whereby the residual electric capacity in the battery was transferred into the capacitor.

2. The spent cylindrical rechargeable lithium battery discharged in step 1 was immersed in a vessel filled with water, followed by subjecting to quick freezing, whereby the battery was sealed in an ice.

The impedances between the positive and negative terminals of the used battery before and after the cooling treatment were measured in the same manner as in Example 1. The measured results revealed that the impedance before the cooling treatment is 80 m$\Omega$ and that after the cooling treatment is more than 3 k$\Omega$. Based on this and the result of the measurement of the ionic conductivity of the electrolyte solution in the same manner as in Example 2, the ionic conductivity before the cooling treatment was found to seemingly have been decreased to $1/10$ by the cooling treatment.

3. The battery sealed in the ice in step 2 was taken out in a nitrogen gas atmosphere, it was mounted on a fixing table, followed by transporting to a disk cutter capable of rotating at a high speed to conduct cutting for an object, where the battery sealed in the ice was cut whereby the battery housing of the battery was unsealed.

4. The battery thus unsealed was thawed, followed by washing with acetone, where the resultant mixed solvent composed of the electrolyte solution, acetone and water was recovered. From the cylindrical can as the battery housing, the anode, separator and cathode were taken out and they were separately recovered. The above mixed solvent composed of the electrolyte solution, acetone and water was subjected to distillation, where the electrolyte, organic solvent and methanol were separately recovered.

EXAMPLE 6

In this example, for a prismatic rechargeable lithium battery having the configuration shown in FIG. 10, based on the flow diagram shown in FIG. 2, the battery housing thereof was unsealed and subjected to washing, the resultant was dissociated into individual battery components, and these battery components were separately recovered. Though not shown in FIG. 10, in said prismatic rechargeable lithium battery, a battery housing made of an aluminum alloy and a battery capping, provided with a pair of outputting and inputting terminals and a plurality of safety vents are assembled through an O-ring and with vises.

As the above battery, there was used a used prismatic rechargeable lithium battery in which an anode formed by applying a paste (obtained by mixing a natural graphite with polyvinylidene fluoride (as a binder) to obtain a mixture and adding N-methyl-2-pyrrolidone to said mixture) on a copper foil and drying the resultant, a cathode formed by applying a paste (obtained by mixing a lithium-cobalt oxide material (as a cathode active material), acetylene black (as an electrically conductive auxiliary) and polyvinylidene fluoride (as a binder) to obtain a mixture and adding N-methylpyrrolidone to said mixture) on an aluminum foil and drying the resultant, a separator comprising a polyethylene member having a number of pores, and an electrolyte solution obtained by dissolving lithium tetrafluoroborate in an amount of 1 M (mol/1) in a mixed solvent composed of ethylene carbonate (EC) and dimethyl carbonate (DMC) with an equivalent mixing ratio are sealed, and a blade spring for pressing in order to shorten the distance between the cathode and anode is inserted.

In the following, the step of discharging and recovering the residual electric capacity in the battery prior to cooling the battery in the flow diagram in FIG. 2, the step of cooling the battery, the unsealing step, and the recovering step will be sequentially explained with reference to FIG. 2.

As the cooling means, there was used dry ice-methanol.

1. A capacitor was electrically connected to the outputting terminal of the prismatic rechargeable lithium battery, followed by subjecting the battery to discharging, whereby the residual electric capacity in the battery was transferred into the capacitor.

2. The used prismatic rechargeable lithium battery discharged in step 1 was immersed in a dry ice-methanol freezing agent obtained by adding dry ice to methanol, whereby the battery was cooled to a temperature lower than the coagulation point of the mixed solvent (composed of the ethylene carbonate and dimethyl carbonate) of the electrolyte solution to decrease the ionic conductivity in the battery.

The impedances between the positive and negative terminals of the battery before and after the cooling treatment were measured in the same manner as in Example 1. The measured results revealed that the impedance before the cooling treatment is 70 m$\Omega$ and that after the cooling treatment is more than 1 M$\Omega$. Based on this and the result of the measurement of the ionic conductivity of the electrolyte solution in the same manner as in Example 2, the ionic conductivity before the cooling treatment was found to seemingly have been decreased to $\frac{1}{10}$ as a result of the cooling treatment.

3. The battery cooled in step 2 was taken out in an Ar gas atmosphere, and the vises were loosened to detach the battery capping having the safety vents, whereby the battery housing was unsealed.

4. From the battery thus unsealed, the anode, separator, cathode and blade spring were taken out, followed by subjecting to washing with methanol, and the anode, separator, cathode, and blade spring and also the mixed solvent composed of the electrolyte solution and the methanol were separately recovered. The mixed solution composed of the electrolyte solution and methanol was subjected to distillation, where the electrolyte, organic solvent and methanol were separately recovered.

Incidentally, in each of the foregoing examples 2 to 6. the recovery operation was conducted for 10 batteries. Neither smoke nor spark were occurred, the battery components were not damaged due to burning or the like and the battery components could be desirably recovered in any case.

In each of the foregoing examples 2 to 6, description has been made of the recovery of the enclosed type lithium battery. But the recovering manner of any of these examples is not restrictive. The recovering manner described any of these examples is effective in recovering other enclosed type batteries as nickel-metal hydride battery, nickel-cadmium battery, lead battery and the like.

As above described, according to the present invention, for any spent, enclosed type batteries, its constituent components can be more safely recovered while desirably preventing them from being damaged and at a high recovery rate. And the recovering apparatus (system) enables to relatively easy recovery of the components of an enclosed type battery at a reasonable cost.

What is claimed is:

1. A process for recovering the constituent components of a sealed battery comprising at least a cathode, an anode and an electrolyte sealed in a battery housing, wherein said electrolyte comprises a solution which comprises a solvent and said electrolyte is positioned between said cathode and said anode, comprising a step (a) of transporting said electrolyte solution or the solvent of said electrolyte solution from inside said battery housing to outside said battery housing to decrease the conductance between said cathode and said anode of said sealed battery and a step (b) of opening said battery housing of the sealed battery after conducting said step (a).

2. The process according to claim 1, wherein the sealed battery has a safety vent, and a differential pressure between the inside and the outside of the battery housing actuates said safety vent extracting the electrolyte solution or the solvent of the electrolyte solution through said safety vent to the outside of the battery housing.

3. The process according to claim 2, wherein a portion of the sealed battery where the safety vent is provided is positioned to face in a downward direction and the electrolyte solution or the solvent of the electrolyte solution is extracted through the safety vent to the outside of the battery housing.

4. The process according to claim 1, wherein the electrolyte solution or the solvent of the electrolyte solution extracted outside the battery housing is recovered.

5. A process for recovering the constituent components of a sealed battery comprising at least a cathode, an anode and an electrolyte sealed in a battery housing, wherein said electrolyte comprises a solution which comprises a solvent and said electrolyte is positioned between said cathode and said anode, comprising a step (a) of sorting said sealed battery depending on the shape or the type, a step (b) of decreasing the conductance between said cathode and said anode of said sealed battery by cooling said sealed battery to a temperature lower than the freezing point of said solvent of said electrolyte solution, and a step (c) of opening said battery housing of the sealed battery after conducting said step (b).

6. A process for recovering the constituent components of a sealed battery comprising at least a cathode, an anode and a polymer solid electrolyte solidified using a solidifying polymer sealed in a battery housing, said polymer solid electrolyte being positioned between said cathode and said anode comprising a step (a) of decreasing the conductance between said cathode and said anode of said sealed battery by cooling said sealed battery to a temperature lower than the glass transition temperature of said solidifying polymer of said polymer solid electrolyte and a step (b) of opening said battery housing of the sealed battery after conducting said step (a).

7. The process according to claim 5 or 6, wherein the sealed battery is cooled with a compressed incombustible gas selected from the group consisting of nitrogen, argon, helium, carbon dioxide, a fluorocarbon, or mixtures thereof.

8. The process according to claim 5 or 6, wherein the sealed battery is cooled by immersing the sealed battery in a cooling agent.

9. The process according to claim 8, wherein the cooling agent is a mixture of a dry ice and methanol or a mixture of a dry ice and ethanol.

10. The process according to claim 5 or 6, wherein the sealed battery is immersed in water, the sealed battery is frozen together with said water to seal the sealed battery in the ice produced and the sealed battery is opened while the sealed battery is sealed in the ice.

11. The process according to claim 1, 5 or 6, wherein the step of opening the battery housing of the sealed battery is conducted in an incombustible atmosphere.

12. The process according to claim 11, wherein the incombustible atmosphere comprises a gas selected from the group consisting of nitrogen, argon, helium, carbon dioxide, steam and a fluorocarbon.

13. The process according to claim 7, wherein the step of opening said battery housing is conducted in an incombustible atmosphere composed of the same gas as that used in cooling the sealed battery.

14. The process according to claim 1, 5 or 6, wherein the step of opening the battery housing of the sealed battery is conducted with a cutting method selected from the group consisting of high pressure water cutting, laser beam cutting and mechanical cutting.

15. The process according to claim 14, wherein the high pressure water cutting comprises spraying water under a high pressure and containing an abrasive through a jet nozzle.

16. The process according to any of claims 1, 5, or 6, wherein the sealed battery is a lithium battery in which oxidation-reduction reaction of lithium ion occurs.

17. The process according to any of claims 1, 5, or 6, wherein the sealed battery is a nickel-metal hydride battery in which oxidation-reduction reaction of hydrogen ion is used and a hydrogen storage alloy is used as an anode material.

18. The process according to any of claims 1, 5, or 6, wherein the sealed battery is a nickel-cadmium battery.

19. The process according to any of claims 1, 5, or 6, wherein the sealed battery is a lead-acid battery.

20. The process according to claim 16 which further includes a step of reacting a reacting agent with an active lithium contained in the lithium battery to decrease the reactivity of said active lithium after the step of opening said battery housing.

21. The process according to claim 20, wherein the reacting agent comprises one or more materials selected from the group consisting of water, alcohols, acids, and carbon dioxide.

22. The process according to claim 16 which further includes a step of washing the opened lithium battery using an organic solvent after the step of opening said battery housing.

23. The process according to claim 22, wherein the organic solvent is an organic solvent incapable of producing an azeotrope with water.

24. The process according to claim 22 which further includes a step of dissociating the sealed battery into individual battery components and recovering the constituent components of the sealed battery after the washing step using the organic solvent.

25. The process according to claim 1 or 6, wherein the sealed battery is sorted depending on the shape or the type prior to the step (a).

26. The process according to any of claims 1, 5, or 6, which further includes a step of discharging the residual electric capacity of the sealed battery prior to conducting the step of decreasing the conductance between said cathode and said anode of said sealed battery.

27. The process according to claim 26, wherein in the step of discharging the residual electric capacity, an energy discharged is recovered.

28. An apparatus for recovering the constituent components of a sealed battery comprising at least a cathode, an anode and electrolyte comprising an electrolyte solution which comprises a solvent housed in a battery housing, said electrolyte being positioned between said cathode and said anode, said apparatus comprising a means (i) for decreasing the conductance between said cathode and said anode of said sealed battery and a means (ii) for opening said battery housing, said means (i) for decreasing the conductance comprising a liquid extraction means (i-a) for extracting said electrolyte solution or the solvent of said electrolyte solution outside said battery housing.

29. The apparatus according to claim 28, wherein the sealed battery has a capping provided with a safety vent, and the liquid extraction means (i-a) includes a means (i-b) for causing a differential pressure between the inside and the outside of the battery housing through said safety vent to actuate said safety vent to extract the electrolyte solution or the solvent of the electrolyte solution outside the battery housing.

30. The apparatus according to claim 29, wherein the means (i-b) comprises at least a vessel (i-c) capable of being evacuated and which is provided with an exhausting means.

31. The apparatus according to claim 30, wherein the vessel (i-c) has a member capable of tightly contacting or joining with an exterior wall face portion of the battery housing of the sealed battery, said exterior wall face portion comprising a portion of the capping, said portion including the neighborhood of the safety vent, and said member having an opening through which said exterior wall face portion is communicated with the vessel (i-c) so that the electrolyte solution or the solvent thereof in the sealed battery can be extracted through said member into the vessel (i-c).

32. The apparatus according to claim 30, wherein a passage capable of introducing air, nitrogen or inert gas is provided at the vessel (i-c) through a valve.

33. The apparatus according to claim 29, wherein a closed space comprising at least a part of an exterior wall face of the battery housing including the neighborhood of the safety vent and the vessel (i-c) is formed such that the safety vent is situated within said closed space and the internal pressure of said closed space can be decreased to be lower than the pressure inside the sealed battery, wherein the electrolyte solution or the solvent thereof in the sealed battery can be extracted into said closed space.

34. The apparatus according to claim 32, wherein the closed space is established after the internal pressure of the vessel (i-c) is decreased to be lower than the atmospheric pressure by means of an exhausting means.

35. The apparatus according to claim 33, wherein after the closed space is formed, the internal pressure of the closed space is decreased to be lower than that of the sealed battery by means of an exhausting means connected to the vessel (i-c).

36. An apparatus for recovering the constituent components of a sealed battery comprising at least a cathode, an anode and an electrolyte comprising an electrolyte solution which comprises a solvent housed in a battery housing, said electrolyte being positioned between said cathode and said anode, said apparatus comprising at least a means (i) for sorting said sealed battery depending on the shape or the type, a means (ii) for decreasing the conductance between said cathode and anode of said sealed battery, and a means (iii) for opening said battery housing, said means (ii) comprising a cooling means (ii-d) for cooling said sealed battery to a temperature lower than the freezing point of the solvent of said electrolyte solution.

37. An apparatus for recovering the constituent components of a sealed battery comprising at least a cathode, an anode and an electrolyte comprising a polymer solid electrolyte solidified by a polymer housed in a battery housing, said electrolyte being positioned between said cathode and said anode, said apparatus comprising at least a means (i) for sorting said sealed battery depending on the shape or the type, a means (ii) for decreasing the conductance between said cathode and anode of said sealed battery, and a means (iii) for opening said battery housing, said means (ii) comprising a cooling means (ii-d) for cooling said sealed battery to a temperature lower than the glass transition temperature of said polymer of said polymer solid electrolyte.

38. The apparatus according to claim 36 or 37, wherein a compressed incombustible gas selected from the group consisting of nitrogen, argon, helium, carbon dioxide, a fluorocarbon, or mixtures thereof is used in the cooling means (ii-d).

39. The apparatus according to claim 36 or 37, wherein a cooling agent is used in the cooling means (ii-d).

40. The apparatus according to claim 39, wherein the cooling agent is a mixture of a dry ice and methanol or a mixture of a dry ice and ethanol.

41. The apparatus according to claim 36 or 37, wherein the cooling means (ii-d) is for immersing the sealed battery in water and freezing the sealed battery together with said water to seal the sealed battery in the ice produced, and the opening means (iii) is for opening the sealed battery sealed in the ice.

42. The apparatus according to claim 28, 36 or 37, wherein the opening means includes a means to open the sealed battery in an incombustible atmosphere.

43. The apparatus according to claim 42, wherein the incombustible atmosphere comprises one or more gases selected from the group consisting of nitrogen, argon, helium, carbon dioxide, steam, and a fluorocarbon.

44. The apparatus according to claim 38, wherein the sealed battery is opened by means of the opening means (iii) in an incombustible atmosphere composed of the same gas as that used in cooling the sealed battery by means of the cooling means (ii-d).

45. The apparatus according to claim 28, 36 or 37, wherein the opening means (iii) comprises a cutting means selected from the group consisting of high pressure water cutting, laser beam cutting and mechanical cutting.

46. The apparatus according to claim 45, wherein the high pressure water cutting means comprises a jet nozzle for spraying water containing an abrasive at high pressure through the jet nozzle.

47. The apparatus according to claim 28, 36 or 37, wherein the sealed battery is a lithium battery in which oxidation-reduction reaction of lithium ion is used.

48. The apparatus according to claim 28, 36 or 37, wherein the sealed battery is a nickel-metal hydride battery in which oxidation-reduction reaction of hydrogen ion is used and a hydrogen storage alloy is used as an anode material.

49. The apparatus according to claim 28, 36 or 37, wherein the sealed battery is a nickel-cadmium battery.

50. The apparatus according to claim 28, 36 or 37, wherein the sealed battery is a lead-acid battery.

51. The apparatus according to claim 47 which further includes a means for reacting a reacting agent with an active lithium contained in the lithium battery to decrease the reactivity of said active lithium after the lithium battery is opened.

52. The apparatus according to claim 51, wherein the reacting agent comprises one or more materials selected from the group consisting of water, alcohols, acids, and carbon dioxide.

53. The apparatus according to claim 28, 36 or 37 which further comprises a means for washing using an organic solvent after the sealed battery is opened.

54. The apparatus according to claim 53, wherein the organic solvent is an organic solvent incapable of producing an azeotrope with water.

55. The apparatus according to claim 53 which further comprises a means for recovering the constituent battery components after washing the opened battery using the organic solvent.

56. The apparatus according to claim 28 which further comprises a means for sorting the sealed battery depending on the shape or the type prior to decreasing the conductance between the cathode and the anode of said sealed battery.

57. The apparatus according to claim 28, 36 or 37 which further comprises a means for discharging the electric residual capacity of the sealed battery prior to decreasing the conductance between the cathode and the anode of said battery.

58. The apparatus according to claim 57, wherein the discharging means includes a means for recovering an energy discharged.

59. The apparatus according to claim 43, which further comprises a means for recovering the incombustible gas of the opening atmosphere and purifying the incombustible gas recovered to recycle.

60. The apparatus according to claim 38 which further comprises a means for recovering the gas used in cooling the sealed battery and purifying the gas recovered to recycle.

61. The apparatus according to claim 54 which further comprises a means for recovering the constituent battery components after washing the opened battery with the use of the organic solvent.

* * * * *